(12) United States Patent
Hwang

(10) Patent No.: US 12,062,989 B2
(45) Date of Patent: *Aug. 13, 2024

(54) POWER CONVERTER AND CONTROLLER FOR A POWER CONVERTER AND MANNERS OF OPERATION THEREOF

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/108,512

(22) Filed: Feb. 10, 2023

(65) Prior Publication Data

US 2023/0198419 A1    Jun. 22, 2023

Related U.S. Application Data

(63) Continuation of application No. 17/215,841, filed on Mar. 29, 2021, now Pat. No. 11,606,040.

(60) Provisional application No. 63/039,728, filed on Jun. 16, 2020.

(51) Int. Cl.
*H02M 3/335* (2006.01)
*H02M 1/00* (2006.01)
*H02M 1/34* (2007.01)

(52) U.S. Cl.
CPC ..... *H02M 3/33592* (2013.01); *H02M 1/0058* (2021.05); *H02M 1/34* (2013.01); *H02M 3/33507* (2013.01)

(58) Field of Classification Search
CPC ........ H02M 1/34; H02M 1/346; H02M 1/348; H02M 3/33507
See application file for complete search history.

(56) References Cited

U.S. PATENT DOCUMENTS

| | | | |
|---|---|---|---|
| 5,430,633 A * | 7/1995 | Smith ............... | H02M 3/33569 363/20 |
| 9,991,803 B1 * | 6/2018 | Wang ...................... | H02M 1/14 |
| 10,103,637 B2 | 10/2018 | Hwang | |
| 10,461,653 B1 | 10/2019 | Wong et al. | |
| 11,606,036 B2 | 3/2023 | Hwang | |
| 2003/0086279 A1 * | 5/2003 | Bourdillon ........ | H02M 3/33576 363/21.12 |
| 2015/0381031 A1 * | 12/2015 | Ghosh ............... | H02M 3/33507 363/21.12 |
| 2016/0344293 A1 * | 11/2016 | Hari ........................ | H02M 1/44 |
| 2017/0179832 A1 * | 6/2017 | Hwang ............. | H02M 3/33569 |
| 2018/0062529 A1 * | 3/2018 | Song ................. | H02M 3/33569 |

(Continued)

*Primary Examiner* — Gary A Nash
(74) *Attorney, Agent, or Firm* — Derek J. Westberg, Esq.

(57) ABSTRACT

A power supply comprises a controller configured to control a power converter by generating drive signals that control the opening and closing of a high side switch and a low side switch. The controller is configured to selectively control the high side switch according to various modes of operation depending on operating conditions such as input voltage and load power consumption. The modes of operation can include, for example, a mode in which the high side switch is closed and then opened once during each of the series of switching cycles and a mode of operation in which the high side switch is closed and then opened two times during each of the series of switching cycles.

19 Claims, 20 Drawing Sheets

(56) References Cited

U.S. PATENT DOCUMENTS

2018/0226884 A1* 8/2018 Hwang .................. H02M 1/36
2018/0226895 A1   8/2018 Song et al.
2019/0013739 A1* 1/2019 Hari ................. H02M 3/33569

* cited by examiner

POWER CONVERTER AND CONTROLLER FOR A POWER CONVERTER AND MANNERS OF OPERATION THEREOF

This application is a continuation of U.S. Ser. No. 17/215,841, filed Mar. 29, 2021 and claims priority of U.S. Provisional Application No. 63/039,728, filed Jun. 16, 2020, the entire contents of each of which are hereby incorporated by reference.

BACKGROUND OF THE INVENTION

The present invention relates to the field of power converters. More particularly, the present invention relates to a power converter and a controller for a power converter.

An off-line power supply receives power from an alternating-current (AC) power source and provides a voltage-regulated, direct-current (DC) output that can be used to power a load. An exemplary off-line power supply includes a power factor correction (PFC) stage and a DC-to-DC power converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output that can be used to power the load. A voltage rectifier, such as a full-bridge rectifier and a smoothing capacitor, can be used in place of the PFC stage, in which case, the DC-to-DC stage can receive a rectified voltage from the voltage rectifier as its input. In either case, the input to the DC-to-DC stage is typically at higher voltage and is more loosely regulated than the output of the DC-to-DC stage.

A flyback power converter (or, more simply, a flyback converter) can be employed in a DC-to-DC power converter. A flyback converter employs a transformer that transfers energy from the input of the flyback converter to its output and provides electrical isolation between the input and output of the flyback converter. An input voltage, such as the rectified output voltage of a PFC stage or rectifier, is applied across the transformer primary winding by closing a switch; as a result, a primary winding current flows and magnetic flux in the transformer increases, thereby storing energy in the transformer. When the switch is opened, the voltage is removed and the primary winding current falls while magnetic flux drops. As a result, a current is induced in a secondary winding of the transformer. This induced current charges an output capacitor to generate an output voltage for powering a load.

Power supplies can be subjected to a variety of input voltage and loading conditions. It is important for such power supplies to operate efficiently so as to minimize power usage. Therefore, what are needed are improved techniques for a power supply that accommodate different operating conditions and that achieve efficient operation. What are further needed are such techniques for a power supply that employs a flyback power converter.

SUMMARY OF THE INVENTION

In accordance with an embodiment, a power supply comprises a power converter having a transformer, a low side switch configured to draw current from a supply voltage through a primary winding of the transformer and a high side switch configured to couple the primary winding of the transformer to a snubber capacitor. A controller is configured to control the power converter by generating drive signals that control the opening and closing of the high side switch and the low side switch. The controller is configured to selectively control the high side switch according to various modes of operation depending on operating conditions such as input voltage and load power consumption. The modes of operation can include, for example, a mode in which the high side switch is closed and then opened once during each of the series of switching cycles and a mode of operation in which the high side switch is closed and then opened two times during each of the series of switching cycles.

These and other embodiments are disclosed herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
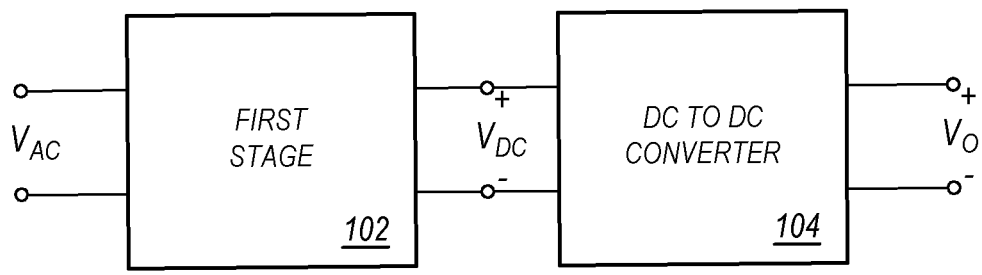
FIG. 1 illustrates a block schematic diagram of a two-stage, off-line power supply in accordance with an embodiment of the present invention.

The present invention is directed toward a power converter and a controller for a power converter and manners of operation thereof. The converter can be, for example, a flyback power converter employed in an offline switching power supply. In accordance with an embodiment of the present invention, the power converter employs two synchronously-operated transistor switches on the transformer primary side. A first of the transistor switches couples the transformer primary winding to a ground node and is referred to herein as the "low side" switch. A second of the two transistor switches couples the transformer primary winding to an input supply voltage via a snubber capacitor and is referred to herein as the "high side" switch. Switching (i.e. opening and closing) of the low side switch is controlled in a feedback loop to generate a regulated DC output voltage at the transformer secondary side. Switching of the high side switch is controlled, e.g., synchronously with the low side switch, in an effort to maximize efficiency of the power converter. In this context, efficiency refers to transfer of power from the input of the power converter to its output.

In accordance with an embodiment of the present invention, a controller for a power converter is provided. The controller is configured to control a power converter having a transformer, a low side switch and a high side switch. The low side switch draws current from an input supply voltage through a primary winding of the transformer. When the low side switch is opened, energy from the primary winding of the transformer is transferred to the snubber capacitor though the high side switch. The high side switch can also be used to discharge the snubber capacitor. The controller controls the opening and closing of the low side switch and the high side switch to generate a regulated output voltage.

In accordance with embodiments of the present invention, the low side switch is generally operated in accordance with: (1) a frequency control mode in which frequency of switching is controlled in a frequency control mode feedback loop to regulate the output voltage; and (2) a current control mode in which peak current in the primary winding of the transformer for each switch cycle is controlled in a current control mode feedback loop for regulating the output voltage.

In accordance with embodiments of the present invention, the high side switch is operated in a manner that is generally synchronous with the low side switch though this synchronous operation can be, at any instant, in accordance with one of several modes of synchronous operation. Under some conditions, the high side switch may be temporarily disabled (i.e. held open or "off"). A voltage ($V_s$) is generated at a node between the low side switch and the high side switch. During each switching cycle, the level of $V_s$ rises after the low side switch is opened and, then, the level of $V_s$ eventually falls from its peak level.

In accordance with an embodiment of a first mode of operation of the high side switch, the high side switch is closed when the voltage $V_s$ is rising and is equal to, or very nearly equal to, a voltage level on the snubber capacitor. This voltage level on the snubber capacitor is generally the same as the level of the input voltage $V_{IN}$ plus the level of a voltage $V_{CSN}$ across the snubber capacitor. This closing of the high side switch discharges the snubber capacitor. The high side switch can be opened when the level of $V_s$ falls to the level of $V_{IN}$. This indicates that the snubber capacitor has been discharged.

In accordance with an embodiment of a second mode of operation of the high side switch, the high side switch is closed after the voltage $V_s$ has fallen from its peak and is equal to, or very nearly equal to, a voltage level on the snubber capacitor, the voltage level on the snubber capacitor being generally the same as the level of the input voltage $V_{IN}$ plus the level of a voltage $V_{CSN}$ across the snubber capacitor. This closing of the high side switch discharges the snubber capacitor. The high side switch can be opened when the level of $V_s$ falls to the level of $V_{IN}$. This indicates that the snubber capacitor has been discharged. The first and second modes of operation can both be performed with the high side switch being operated under zero volt switching conditions. The high side switch is closed earlier in each switching cycle in the first mode of operation in comparison to the second mode of operation. This is because in the first mode of operation, the level of $V_s$ is rising when the high side switch is closed, and in the second mode of operation, the level of $V_s$ has fallen from its peak when the high side switch is closed.

In accordance with an alternative of the second mode of operation of the high side switch, the level of $V_s$ is first allowed to oscillate one or more cycles of oscillation before the high side switch is closed. As in the second mode of operation described above, the high side switch is closed when the voltage $V_s$ is equal to, or very nearly equal to, a voltage level on the snubber capacitor, the voltage level on the snubber capacitor being generally the same as the level of the input voltage $V_{IN}$ plus the level of a voltage $V_{CSN}$ across the snubber capacitor. The high side switch can be opened when the level of $V_s$ falls to the level of $V_{IN}$ which indicates that the snubber capacitor has been discharged.

The switching power supply can be, for example, operated with the high side switch being operated: in accordance with the first mode operation; in accordance with the second mode of operation; or in accordance with both of the first and second modes of operation together. When the first mode of operation and the second mode of operation are performed together, the high side switch is closed and opened and then closed and opened while the low side switch stays opened. In other words, the high side switch is cycled on and then off twice for each cycle of the low side switch.

In accordance with an embodiment of a third mode of operation of the high side switch, the high side switch is closed and then opened where at least the opening of the high side switch is without reference to, or in response to monitoring of, the level of $V_g$. In this mode of operation, the high side switch may be closed when the voltage $V_g$ is is equal to, or very nearly equal to, a voltage level on the snubber capacitor. However, the high side switch may then be opened in response to a level transition of a fixed or adjustable duration pulse and without regard to the level of $V_g$. This pulse is generated during the portion of each switching cycle during which the low side switch is closed. The precise timing of generation and duration of the pulse signal can be controlled by the controller of the switching power supply. This third mode of operation can be entered, for example, when the input voltage to the flyback converter falls below a predetermined input voltage threshold or under light load conditions. In still another mode of operation of the high side switch, the high side switch is held open or off, while the body diode of the high side switching transistor performs passive rectification. This mode of operation can also be entered, for example, when the input voltage to the flyback converter falls below a predetermined input voltage threshold or under light load conditions.

The switching power supply can be, for example, operated with the high side switch being operated: in accordance with the first mode operation; in accordance with the second mode of operation; in accordance with the third mode operation; or in accordance with multiple modes of operation together. When two modes of operation are performed together (e.g., first and second modes or second and third modes), the high side switch is closed and opened and then closed and opened while the low side switch stays opened. In other words, the high side switch is cycled on and then off twice for each cycle of the low side switch.

The term "continuous conduction mode" or "CCM" means that current in the primary winding of the transformer of a power converter flows continuously throughout successive switching cycles. The term "discontinuous conduction mode" or "DCM" means that the current in the primary winding of the transformer is allowed to fall to zero for a period of time (i.e. "dead" time) during each switching cycle. The term "critical conduction mode" or "CRM" refers to operation at or near the boundary between CCM and DCM operating modes. In other words, during CRM, the current in the primary winding to allowed to fall to zero just before the current rises again.

Operation in CRM is useful during high loading conditions in order to achieve high efficiency. When loading is reduced, however, the level of current in the primary winding that is required to maintain a regulated output voltage is also reduced. As a result, operation at lower loading levels tends to revert to DCM. The level of the input voltage can also affect operation. For example, when the input voltage is higher, the "dead" time duration in DCM tends to increase, whereas, when the input voltage is lower, the "dead" time duration in DCM tends to decrease. Input voltage levels can vary based on the level of the AC line voltage. For example, different countries have adopted different AC line voltage levels as their respective standards. Loading can also affect the input voltage level; for example, increased current draw from an AC source can reduce its voltage level.

In an embodiment, under light loading conditions, the switching power supply is operated in accordance with DCM. Under light loading conditions, the switching power supply can be operated in the frequency control mode feedback loop to regulate the output voltage. Additionally, under light loading conditions, the high side switch can, for example, be operated in accordance with the first mode of operation of the high side switch or in accordance with the second mode of operation of the high side switch or in accordance with both the first and second modes of operation of the high side switch (the first and second modes being operative together) or in accordance with the second and third modes of operation of the high side switch (the second and third modes being operative together).

In an embodiment, under heavy loading conditions, the switching power supply is operated in accordance with CRM. Under heavy loading conditions, the switching power supply can be operated in the current control mode feedback loop to regulate the output voltage. Additionally, under heavy loading conditions, the high side switch can, for example, be operated in accordance with the second mode of operation of the high side switch or in accordance with the third mode of operation or in accordance with both the first and second modes of operation of the high side switch (the first and second modes being operative together).

In an embodiment, under transitional loading conditions, where the loading level is between the light and heavy loading conditions, the switching power supply preferably transitions its operation between the frequency control mode feedback loop and the current control mode feedback loop with hysteresis. Additionally, under transitional loading conditions, the switching power supply can be operated in DCM or CRM. This may also be in accordance with hysteresis such that the operation under transitional loading may depend upon whether the power supply operated in DCM or CRM just prior to entry into operation under transitional loading. Similarly, under transitional loading conditions, the high side switch is preferably operated in accordance with the mode (or modes) of operation of the high side switch in which it is operated just prior to entry into operation under transitional loading.

FIG. 1 illustrates a block schematic diagram of a two-stage, off-line power supply 100 in accordance with an embodiment of the present invention. As shown in FIG. 1, a first stage 102 has an input coupled to alternating-current (AC) source. The first stage 102 performs rectification on the AC input signal. The first stage 102 can also perform power factor correction (PFC), in which case, the first stage 102 also maintains current drawn from the AC source substantially in phase with the AC voltage so that the power supply 100 appears as a resistive load to the AC source. The PFC stage can be replaced with a voltage rectifier, such as a full-bridge rectifier and a smoothing capacitor.

The first stage 102 generates a loosely regulated voltage, $V_{DC}$, which is provided as input to a DC-to-DC converter 104. Using the input supply voltage $V_{DC}$, the DC-to-DC converter stage 104 generates a voltage-regulated, DC output, $V_O$, which can be used to power a load. The level of $V_{DC}$ is preferably at a higher voltage and is more loosely regulated than the output, $V_O$, of the DC-to-DC converter stage 104. The nominal level of the output, $V_{DC}$, of the first stage 102 may be, for example, approximately 380 volts DC, while the voltage-regulated output, $V_O$, of the DC-to-DC converter stage 104 may be, for example, approximately 15.0 volts DC. The input voltage, $V_{AC}$, can be of different levels and frequencies, depending upon availability. For example, in the United States, 120 volts at 60 Hz is generally available, whereas, in China, 220 volts at 50 Hz is generally available.

Figure 2:
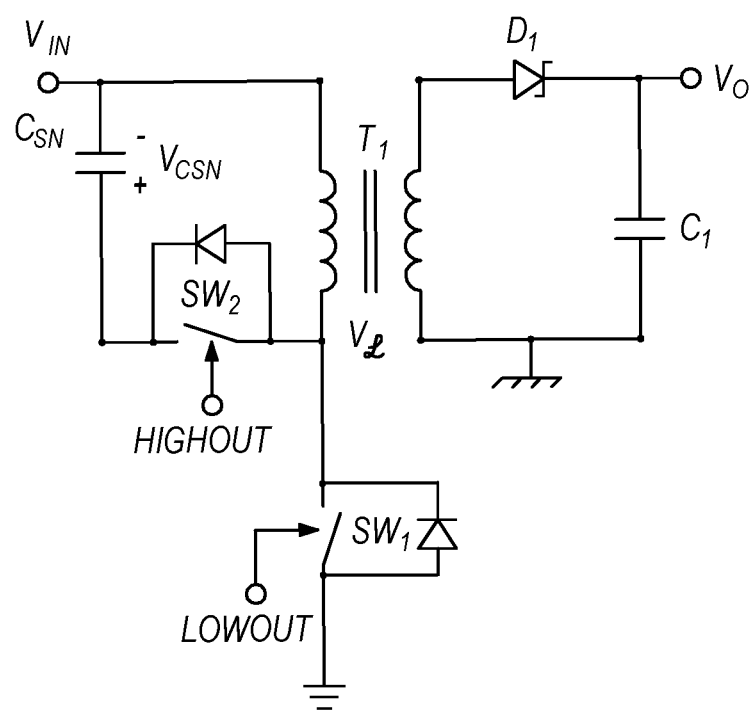
FIG. 2 illustrates a flyback converter suitable for use in a DC-to-DC converter in accordance with an embodiment of the present invention.

FIG. 2 illustrates a flyback converter 150 in accordance with an embodiment of the present invention. The flyback converter 150 is suitable for use in a DC-to-DC converter of a switching power supply, such as the DC-to-DC converter 104 of FIG. 1. The flyback converter 150 receives an input voltage from source $V_{IN}$ that can be a rectifier output or PFC stage output, Vic, or that can be received from some other source, such as an electromagnetic interference (EMI) filter.

As shown in FIG. 2, the input voltage source $V_{IN}$ is coupled to a first terminal of a capacitor $C_{SN}$ and to a first terminal of a primary winding of a transformer $T_1$. The capacitor $C_{SN}$ functions as a snubber capacitor. A voltage $V_{CSN}$ having polarity as shown in FIG. 2 is formed across the capacitor $C_{SN}$. A second terminal of the primary winding of the transformer $T_1$ is coupled to a first terminal of a switch $SW_1$ ("low side" switch) and to a first terminal of a switch $SW_2$ ("high side" switch). A voltage $V_s$ is formed at a node between the low side switch $SW_1$ and the high side switch $SW_2$ and at the second terminal of the primary winding of the transformer $T_1$. A second terminal of the switch $SW_1$ is coupled to a first ground node. A second terminal of the switch $SW_2$ is coupled to a second terminal of the capacitor $C_{SN}$. The switch $SW_1$ is controlled by a signal LOWOUT while the switch $SW_2$ is controlled by a signal HIGHOUT.

The low side switch $SW_1$ and the high side switch $SW_2$ are each preferably implemented by a corresponding power MOSFET. Thus, a body diode is shown associated with each of switches $SW_1$ and $SW_2$.

A first terminal of a secondary winding of the transformer $T_1$ is coupled to an anode of a Zener diode $D_1$. A cathode of the diode $D_1$ is coupled to a first terminal of a capacitor $C_1$. A second terminal of the secondary winding of the transformer $T_1$ is coupled to a second terminal of the capacitor $C_1$ and to a second ground node. The first and second ground nodes are preferably electrically isolated from each other.

The flyback converter 150 is operated by opening and closing the switches $SW_1$ and $SW_2$. The transformer $T_1$ transfers energy from the input of the flyback converter 150 to its output and provides isolation between the input and output of the flyback converter 150. In operation, when the switch $SW_1$ is closed (the switch is turned "ON"), voltage source $V_{IN}$ is applied across the primary winding of the transformer $T_1$. As a result, a current in the primary winding and a magnetic flux in the transformer $T_1$ increases, which stores energy in the transformer $T_1$. When the switch $SW_1$ is then opened (the switch is turned "OFF"), the current in the primary winding and the magnetic flux drops. As a result, a current is induced in the secondary winding of the transformer $T_1$ that charges the capacitor $C_1$ with energy to generate an output voltage $V_O$ for powering a load.

The level of power transferred to the load can be controlled by adjusting the switching duty cycle of the switch $SW_1$ (e.g., by controlling peak input current), the switching frequency of the switch $SW_1$, or both. Controlling the duty cycle is referred herein to as peak current control, whereas, controlling the switching frequency is referred to herein as frequency control.

When the switch $SW_1$ is opened and the switch $SW_2$ is in the closed position (the switch $SW_2$ is "ON"), the current in the primary winding of the transformer $T_1$ can pass through the switch $SW_2$ to the snubber capacitor $C_{SN}$. Alternatively, when the switch $SW_1$ is opened and the switch $SW_2$ is in the open position (the switch $SW_2$ is "OFF"), the current in the primary winding of the transformer $T_1$ can pass through the body diode of the switch $SW_2$ to the snubber capacitor $C_{SN}$. Closing the switch $SW_2$ can also discharge the snubber capacitor $C_{SN}$ depending on its voltage level as compared to the level of $V_s$.

In a typical switching cycle, the high side switch $SW_2$ is preferably controlled such that it is open (OFF) when the low side switch $SW_1$ is closed (ON). Then, when the switch $SW_1$ is opened (OFF) and energy from the transformer $T_1$ transferred to the output capacitor $C_1$, the voltage $V_s$ will become equal to or nearly equal to the voltage at the capacitor $C_{SN}$. Under these conditions, the switch $SW_2$ can be briefly closed (ON). The switch $SW_2$ can, therefore, be operated under zero volt switching (ZVS) conditions. Closing the switch $SW_2$ equalizes the level of $V_s$ to that of $V_{IN}+V_{CSN}$. Then, once $V_s$ and $V_{IN}+V_{CSN}$ are substantially equalized, the switch $SW_2$ can be opened (OFF). The voltage $V_s$ falls after the switch $SW_2$ is opened, such that when the switch $SW_1$ is closed, the voltage across it may be zero or nearly zero. Thus, the switch $SW_1$ can also be operated under zero volt switching (ZVS) conditions. The cycle then repeats. Operation of the switches $SW_1$ and $SW_2$ in accordance with ZVS, as described above, can be advantageous but is not always necessary.

To summarize, during a typical switching cycle, the low side switch $SW_1$ is turned off; then the high side switch $SW_2$ is turned on and then off before the low side switch $SW_1$ is turned on again. The cycle is then repeated (i.e. $SW_1$—off, $SW_2$—on, $SW_2$—off, $SW_1$—on, $SW_1$—off, ...). The high side switch $SW_2$ is thus turned on then off once (or twice as explained herein) before each low side switch $SW_1$ turn on event. Also, the high side switch $SW_2$ is turned on then off once (or twice) for each cycle of the low side switch $SW_1$ (while the low side switch $SW_1$ is off). In other words, each of the switches $SW_1$ and $SW_2$ is turned on and then off while the other switch is off.

In an embodiment, both switches $SW_1$ and $SW_2$ are operated under ZVS. In other embodiments, the switches $SW_1$ and $SW_2$ are not operated under ZVS or are operated partially under ZVS. For example, in accordance with an embodiment of the present invention, the high side switch $SW_2$ is opened at a time instant that depends upon the level of $V_{IN}$. In this circumstance, the switch $SW_2$ may be opened under non-ZVS conditions because it is opened before or after the level of $V_s$ is equal to $V_{IN}+V_{CSN}$. In another example, the high side switch $SW_2$ can be opened in response to a fixed or adjustable duration pulse signal, as described in more detail herein; in this circumstance, the switch $SW_2$ may not be operated completely in accordance with ZVS.

The flyback converter 150 has a resonant switching frequency. The resonant frequency is dependent upon physical characteristics of the flyback converter 150, including the inductance value of the transformer $T_1$ primary winding and parasitic capacitance of the switches $SW_1$ and $SW_2$. When the switch $SW_2$ is closed, this introduces the capacitance of the snubber capacitor $C_{SN}$ and therefore effectively changes the instantaneous resonant frequency of the flyback converter 150 while the switch $SW_2$ is closed.

The diode $D_1$ coupled to the transformer $T_1$ secondary winding operates as a freewheeling diode, allowing current in the secondary winding of the transformer $T_1$ to charge the capacitor $C_1$, and preventing discharge of the capacitor $C_1$ through the transformer $T_1$. The diode $D_1$ can alternatively be replaced with a switch that is operated synchronously with the switches $SW_1$ and $SW_2$ (synchronous rectification).

The switching, and particularly that of the high side switch $SW_2$, can be performed in accordance with various modes of operation, depending upon operating conditions. These operating conditions can include, for example, input voltage and loading. In an embodiment, the AC input voltage can be divided into two ranges: "high" and "low." In this case, 220 volts AC input can be considered to be within the "high" range (the "high" range is also referred herein as "high line") whereas 120 volts can be considered to be within the "low" range (the "low" range is also referred to herein as "low line"). The dividing line between the low and high input voltage ranges can be somewhere between 120 and 220 volts AC (e.g., around 170 volts AC). Similarly, the loading can be divided into two ranges: "light" and "heavy." Loading refers to power level demanded by a load to which the power supply provides power. The power supply described herein can provide power to loads that have a wide variety of power requirements, including loads can require different power levels at different times.

Together, variations in the input voltage and load power operating conditions may result in at least four different possible "regions" of operation: (1) high line and light load; (2) high line and heavy load; (3) low line and light load; and (4) low line and heavy load. By changing operating modes in response to these operating conditions, efficiency of the power supply can be improved. While two ranges of input voltage and load power are described, it will be apparent that additional ranges can be provided. For example, rather than light and heavy loading, loading can be "light," "moderate" and "heavy." Similarly, one or more additional ranges can be provided for the input voltage. As explained herein, transitional "regions" of operation may also be provided for transitioning among the above-described regions of operation.

Figure 3:
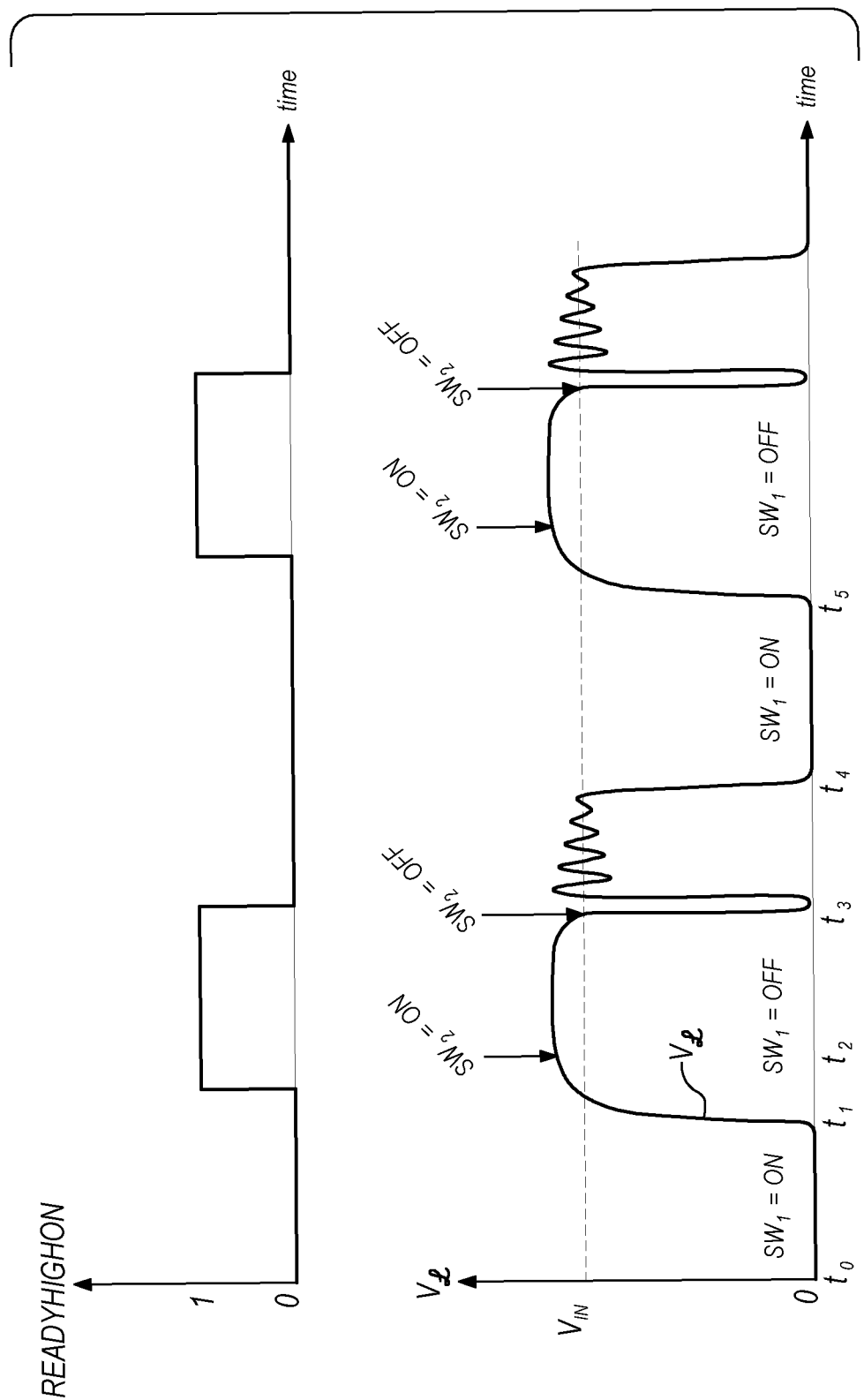
FIG. 3 illustrates a voltage waveform for a flyback converter in a high line, light load mode of operation (also referred to herein as "first" mode of operation) in accordance with an embodiment of the present invention.

FIG. 3 illustrates a voltage waveform for a flyback converter in a high line, light load mode of operation (also referred to herein as "first" mode of operation) in accordance with an embodiment of the present invention. The waveform represents the level of $V_s$ for two switching cycles. As shown in FIG. 3, the switch $SW_1$ is closed (ON) at time $t_0$ so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Current may then pass through the body diode of the switch $SW_2$ while energy from the transformer $T_1$ induces a current in the secondary winding of the transformer $T_1$ which charges the output capacitor $C_1$. Then, when the voltage $V_s$ is rising and is equal to $V_{IN}+V_{CSN}$, or nearly equal to $V_{IN}+V_{CSN}$, the switch $SW_2$ is closed (ON) at time $t_2$. This tends to equalize the level of $V_s$ towards that of $V_{IN}+V_{CSN}$, discharging the capacitor $C_{SN}$. Then, at time $t_3$ the switch $SW_2$ is opened (OFF). The switch $SW_2$ can be opened while the level of $V_s$ is equal to or nearly equal to the level of $V_{IN}$. The voltage $V_s$ then falls before rising again and oscillating in accordance with the resonant frequency of the primary side of the converter. And, at time $t_4$ the switch $SW_1$ is closed (ON). This causes the level of $V_s$ to fall to zero volts while a current again flows in the primary winding of the transformer $T_1$ and the above-described switching cycle repeats. As described above, the high side switch $SW_2$ is essentially operated under ZVS since the voltage across the switch $SW_2$ is zero or nearly so when it is closed and opened.

Also shown in FIG. 3 is a signal waveform for a signal "READYHIGHON." In an embodiment of the present invention, the signal READYHIGHON must be a logic high voltage in order for the switch $SW_2$ to be closed. The period of time during which the signal READYHIGHON is logic high voltage is therefore a "window" of time during which the high side switch $SW_2$ can be closed. In other words, the signal READYHIGHON gives "permission" for the switch $SW_2$ to be closed. As explained herein, the signal READYHIGHON can be used to determine the mode of operation for the switch $SW_2$. As shown in FIG. 3, the level of READYHIGHON is initially a logic low voltage which means that the switch $SW_2$ does not have permission to close. However, at a time between $t_1$ and $t_2$, the level of READYHIGHON transitions to a logic high voltage which gives the switch $SW_2$ permission to close. As explained above, the switch $SW_2$ does close at time $t_2$ when the voltage $V_s$ is equal to $V_{IN}+V_{CSN}$. Then, at the time $t_3$, the switch $SW_2$ is opened. Shortly after the time $t_3$ the signal READYHIGHON transitions to a logic high voltage.

Figure 4:
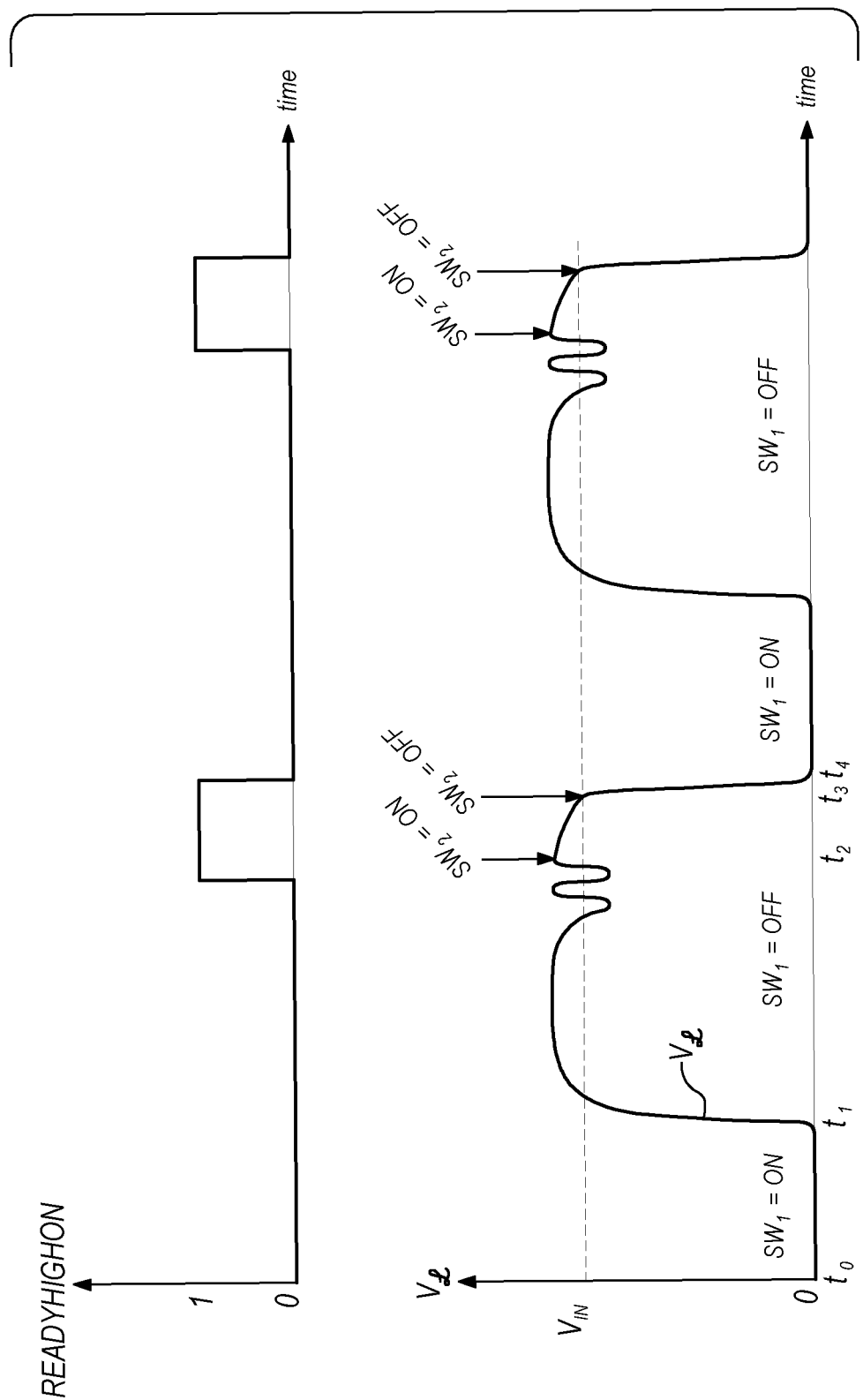
FIG. 4 illustrates a voltage waveform for a flyback converter in an alternative high line, light load mode of operation (also referred to herein as "second" mode of operation) in accordance with an embodiment of the present invention.

FIG. 4 illustrates a voltage waveform for a flyback converter in an alternative high line, light load mode of operation (also referred to herein as "second" mode of operation) in accordance with an embodiment of the present invention. The waveform of FIG. 4 represents the level of $V_s$ for two switching cycles. As shown in FIG. 4, the switch $SW_1$ is initially closed (ON) at time to so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Current may then pass through the body diode of the switch $SW_2$ while energy from the transformer $T_1$ induces a current in the secondary winding of the transformer $T_1$ which charges the output capacitor $C_1$. The voltage $V_s$ may then begin to oscillate in accordance with the resonant frequency of the converter. Then, when the voltage $V_s$ is falling and is equal to $V_{IN}+V_{CSN}$, or nearly equal to $V_{IN}+V_{CSN}$, the high side switch $SW_2$ is briefly closed (ON) at time $t_2$. This equalizes the level of $V_s$ towards that of $V_{IN}+V_{CSN}$, discharging the capacitor $C_{SN}$. Then at time $t_3$ when $V_s$ is equal to or nearly equal to $V_{IN}$ the switch $SW_2$ is opened (OFF). And, at time $t_4$ the switch $SW_1$ is again closed (ON). This causes the level of $V_s$ to fall to zero volts while a current again flows in the primary winding of the transformer $T_1$ and the switching cycle repeats.

Because the voltage $V_s$ is preferably equal to or nearly equal to $V_{IN}+V_{CSN}$ when the switch $SW_2$ is closed, the switch $SW_2$ can be closed under zero volt switching (ZVS) conditions. And, because the voltage $V_s$ is equal to or nearly equal to $V_{IN}$ when the switch $SW_2$ is opened, the switch $SW_2$ can be opened under ZVS conditions. By controlling the high side switch $SW_2$ synchronously with ZVS, this provides for more efficient operation, for example, by avoiding losses caused by non-ZVS switching, and allows for operation at higher switching frequencies than otherwise which also tends to increase efficiency of the flyback converter.

Also shown in FIG. 4 is a signal waveform for the signal READYHIGHON. In contrast to FIG. 3, the READYHIGHON signal of FIG. 4 does not give permission for the switch $SW_2$ to be closed until after the level of $V_s$ has risen beyond the level of $V_{IN}+V_{CSN}$ and has begun to oscillate. More particularly, in FIG. 4, the level of READYHIGHON transitions to a logic high voltage just prior to the time $t_2$ and then returns to a logic low voltage shortly after the time $t_3$. Therefore, by delaying activation of the signal READYHIGHON as compared to FIG. 3, this results in the switch $SW_2$ being closed later in the switching cycle in FIG. 4 (as in the "second mode") as compared to FIG. 3 (which shows the "first mode"). However, in both FIGS. 3 and 4, the precise timing of closing and opening the switch $SW_2$ within the "window" of time provided by the signal READYHIGHON can depend on monitoring the level of $V_s$ in order to maintain ZVS.

The $V_s$ waveform shown in FIG. 4 assumes that the closing of switch $SW_2$ is delayed such that the voltage $V_s$ tends to oscillate. More particularly, FIG. 4 shows two oscillations occurring prior to the closing of switch $SW_2$ at time $t_2$. This is referred to herein as "valley switching." It will be apparent that greater or fewer oscillations can occur while maintaining zero volt switching so long as the switch $SW_2$ is closed at a time when $V_s$ is equal to or nearly equal to $V_{IN}+V_{CSN}$. For example, the switch $SW_2$ may be closed as soon as the falling voltage $V_s$ first becomes equal to $V_{IN}+V_{CSN}$, or nearly equal to $V_{IN}+V_{CSN}$. This is referred to herein as "quasi-resonant" or "first hill" switching. In either case, zero volt switching can be maintained if the switch $SW_2$ is closed at a time when $V_s$ is equal to or nearly equal to $V_{IN}+V_{CSN}$. The flyback converter 150 can selectively operate in accordance with quasi-resonant switching or valley switching, depending upon conditions such as switching frequency, loading conditions, component values, and so forth, in order to regulate the output voltage. These possibilities can be achieved by adjusting the timing of the level transitions of the signal READYHIGHON.

Figure 5:
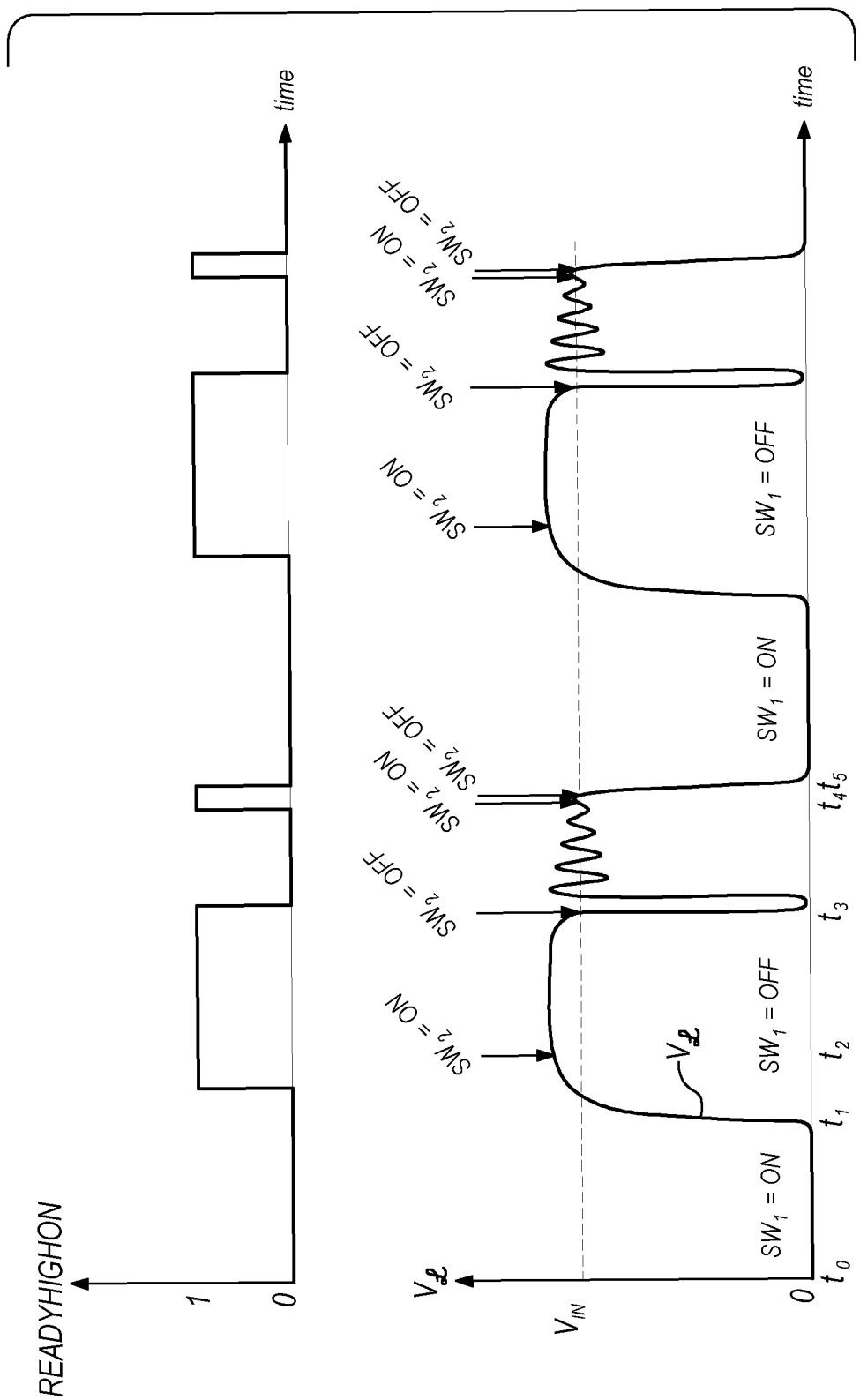
FIG. 5 illustrates a voltage waveform for a flyback converter in another alternative high line, light load mode of operation (also referred to herein as "combined" first and second mode of operation) in accordance with an embodiment of the present invention.

FIG. 5 illustrates a voltage waveform for a flyback converter operating in another alternative high line, light load mode of operation (also referred to herein as "combined" first and second mode of operation) in accordance with an embodiment of the present invention. The waveform of FIG. 5 represents the level of $V_s$ for two switching cycles. As shown if FIG. 5, the switch $SW_1$ is initially closed (ON) at time to so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Then, when the voltage $V_s$ is rising and is equal to $V_{IN}+V_{CSN}$, or nearly equal to $V_{IN}+V_{CSN}$, the switch $SW_2$ is closed (ON) at time $t_2$. This equalizes the level of $V_s$ towards that of $V_{IN}+V_{CSN}$, discharging the capacitor $C_{SN}$. Then, at time $t_3$ the switch $SW_2$ is opened (OFF). The switch $SW_2$ can be opened while the level of $V_s$ is equal to the level of $V_{IN}$. The voltage $V_s$ then falls before rising again and oscillating in accordance with the resonant frequency of the primary side of the converter. Therefore, while the switch $SW_1$ is closed, the switch $SW_2$ is operated in accordance with the first mode of operation as described above in connection with FIG. 3.

Referring to FIG. 5, after the switch $SW_2$ is closed (at time $t_2$) and then opened (at time $t_3$), the level of $V_s$ falls and then may begin to oscillate. When the level of $V_s$ is falling and is equal to, or very nearly equal to, the voltage $V_{IN}+V_{CSN}$, then the switch $SW_2$ can be closed for a second time during this same switching cycle. This is shown in FIG. 5 at time $t_4$. Then the switch $SW_2$ can be opened for a second time during this same switching cycle. This is shown in Figure at time $t_5$, when the level of $V_s$ is equal that of $V_{IN}$. This second cycling of the switch $SW_2$ can therefore be in accordance with the second mode of operation of the switch $SW_2$, as described above in connection with FIG. 4. This second cycling of the high side switch $SW_2$ occurs while the low side switch $SW_1$ remains open. Therefore, the high side switch $SW_2$ is closed and opened twice during each switching cycle of the low side switch $SW_1$.

FIG. 5 also shows a signal waveform for the signal READYHIGHON. This waveform shows two windows of time during which the switch $SW_2$ has permission to be closed during each switching cycle. As in FIG. 3, the first window commences when signal READYHIGHON transitions to a logic high voltage shortly before the time $t_2$. The first window ends when the signal READYHIGHON transitions to a logic low voltage shortly after the time $t_3$. This first window is comparable to the window of FIG. 3. The second window commences when signal READYHIGHON transitions to a logic high voltage shortly before the time $t_4$. The first window ends when the signal READYHIGHON transitions to a logic low voltage shortly after the time $t_5$. This second window is comparable to the window of FIG. 4. Thus, as shown by the two windows of time in FIG. 5, the switch $SW_2$ is given permission to be closed and opened twice during each switching cycle of the low side switch $SW_1$. Additionally, the precise timing of each of these two cycles of the switch $SW_2$ within each window can be based on monitoring $V_s$ and, therefore, ZVS can be maintained for both cycles.

The voltage waveform of FIG. 5 illustrates valley switching operation of the switch $SW_2$ when the switch $SW_2$ is closed for a second time during each switching cycle. FIG. 5 shows five oscillations occurring prior to the closing of switch $SW_2$. It will be apparent that greater or fewer oscillations can occur prior to the closing of switch $SW_2$. For example, in the case of two oscillations, the switch $SW_2$ can be closed as illustrated in FIG. 3. In accordance with the embodiment of FIG. 5, the high side switch $SW_2$ is closed and opened twice during the portion of each switching cycle in which the low side switch $SW_1$ remains open. The high side switch $SW_2$ can be closed a first time while the level of $V_s$ is rising and can be closed the second time after the level of $V_s$ has fallen from its peak. Alternatively, or additionally, high side switch $SW_2$ can be closed a first time before the level of $V_s$ oscillates one or more cycles and can be closed the second time after the level of $V_s$ oscillates. These possibilities can be achieved by adjusting the timing of the level transitions of the signal READYHIGHON.

As shown in FIG. 5, at time $t_5$ the switch $SW_1$ is closed (ON). This causes the level of $V_s$ to fall to zero volts while a current again flows in the primary winding of the transformer $T_1$. The switching cycle then repeats.

Figure 6:
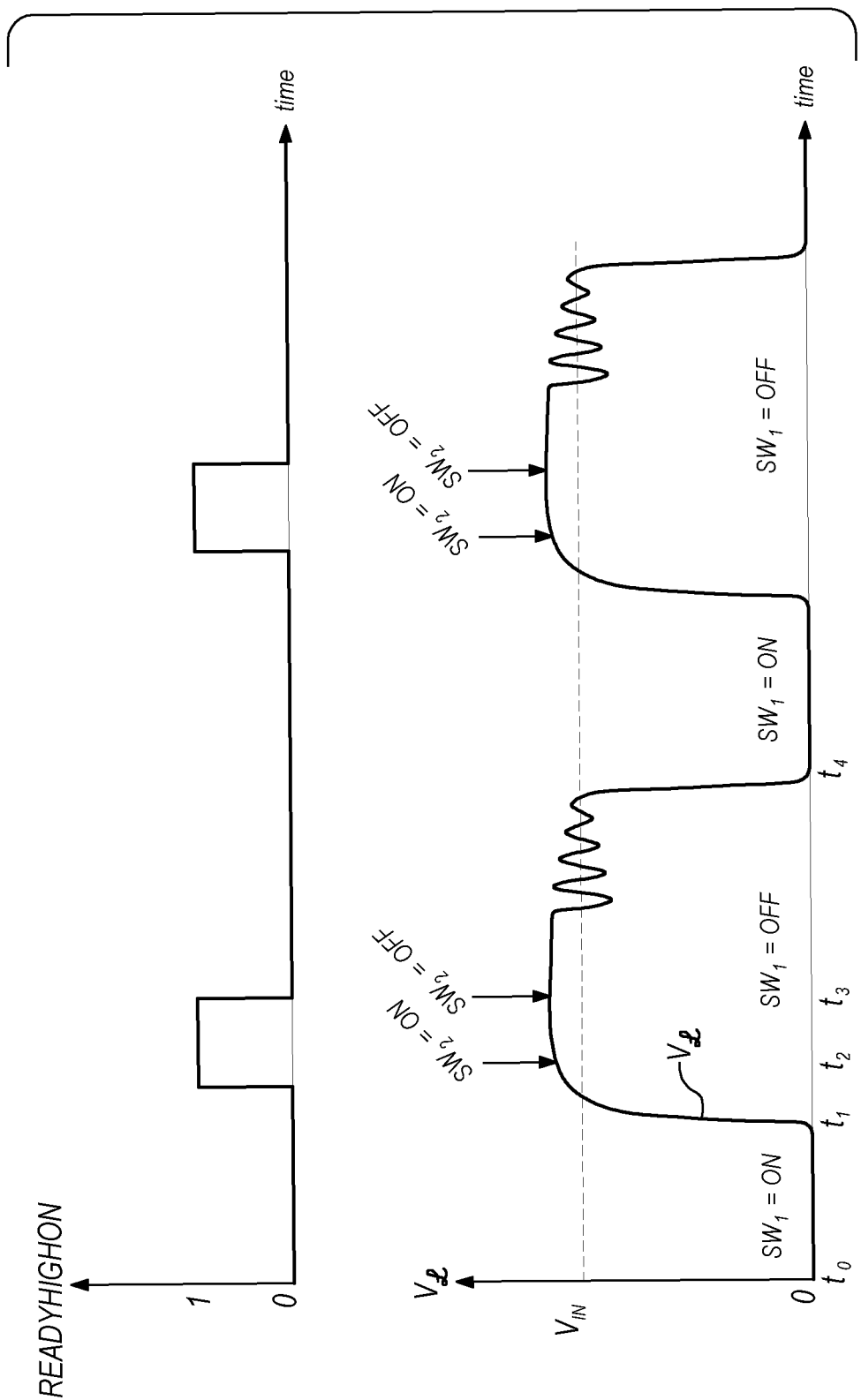
FIG. 6 illustrates a voltage waveform for a flyback converter in a further alternative high line, light load mode of operation (also referred to herein as "third" mode of operation) in accordance with an embodiment of the present invention.

FIG. 6 illustrates a voltage waveform for a flyback converter in a further alternative high line, light load mode of operation (also referred to herein as "third" mode of operation) in accordance with an embodiment of the present invention. The third mode of operation is somewhat similar to the first mode of operation of the high side switch $SW_2$ (which is illustrated in FIG. 3) in that closing the high side switch $SW_2$ can be performed in a similar manner. However, in the third mode of operation, the high side switch $SW_2$ is opened without reference to, or needing to monitor, the level of $V_s$. In this mode of operation, the high side switch can be opened in response to a level transition of a fixed or adjustable duration pulse signal (e.g. the signal READYHIGHON) while the low side switch $SW_1$ remains closed.

More particularly, the signal READYHIGHON which is also shown in FIG. 6 can be used to control the precise timing of opening the high side switch $SW_2$. Unlike the windows of time formed by the signal READYHIGHON in FIGS. 3 and 4, the window of time formed by the signal READYHIGHON closes before the level of $V_s$ is equal that of $V_{IN}$. This closing of the window, therefore, causes the switch $SW_2$ to open immediately when the signal READYHIGHON transitions to a logic low voltage. In other words, the READYHIGHON signal overrides the comparison of $V_s$ to $V_{IN}$ that takes place in FIGS. 3 and 4. The duration of the period during which the high side switch $SW_2$ is closed in this third mode of operation shown in FIG. 6 is adjustable by controlling the duration of the READYHIGHON pulse. The duration of the period during which the high side switch $SW_2$ is closed in this third mode of operation is also generally shorter than that the duration in which the high side switch is closed in the first mode of operation (FIG. 3).

As shown in FIG. 6, the signal READYHIGHON transitions to a logic high voltage shortly before the time $t_2$. Then, as soon as the level of $V_s$ is equal to, or very nearly equal to, the voltage $V_{IN}+V_{CSN}$, then the switch $SW_2$ can be closed. This occurs at the time $t_2$. The signal READYHIGHON transitions to a logic low voltage at the time $t_3$. This causes the high side switch $SW_2$ to be immediately opened at the time $t_3$. Therefore, the switch $SW_2$ remains closed during the time period between $t_2$ and $t_3$. The duration of the time period $t_2$-$t_3$ illustrated in FIG. 6 can be dependent upon the level of $V_{IN}$. For example, FIG. 6 can represent the highest expected level of $V_{IN}$, for example, 380 volts DC. However, this time period can be adjusted based on the level of $V_{IN}$. For example, when $V_{IN}$ is lower than 380 volts DC (e.g., 240 volts DC), then the level of READYHIGHON can transition to a logic low voltage sooner and the switch $SW_2$ can be opened sooner in the switching cycle thereby moving the time $t_3$ closer to $t_2$ and shortening the duration of the time period between $t_2$ and $t_3$. The amount by which the time period $t_2$-$t_3$ is shortened can be proportional to the change in the level of $V_{IN}$.

As explained herein, the switch $SW_2$ is preferably closed under ZVS in accordance with the third mode of operation shown in FIG. 6. However, the switch $SW_2$ can be opened under non-ZVS conditions. Opening the high side switch $SW_2$ under non-ZVS conditions helps to improve efficiency by not fully discharging the snubber capacitor $C_{SN}$ (FIG. 2) under such conditions.

In an alternative of the third mode of operation of the high side switch, the high side switch $SW_2$ is held off, while the body diode of the high side switching transistor $SW_2$ still performs rectification. This can be accomplished by maintaining the level of READYHIGHON a logic low voltage throughout the switching cycle.

In a further alternative of the third mode of operation, the closing of the high side switch $SW_2$ can be in response to the signal READYHIGHON and independent of the level of $V_s$. This can be accomplished by transitioning the level of READYHIGHON before the changing level of $V_s$ would otherwise cause the high side switch $SW_2$ to close.

Figure 7:
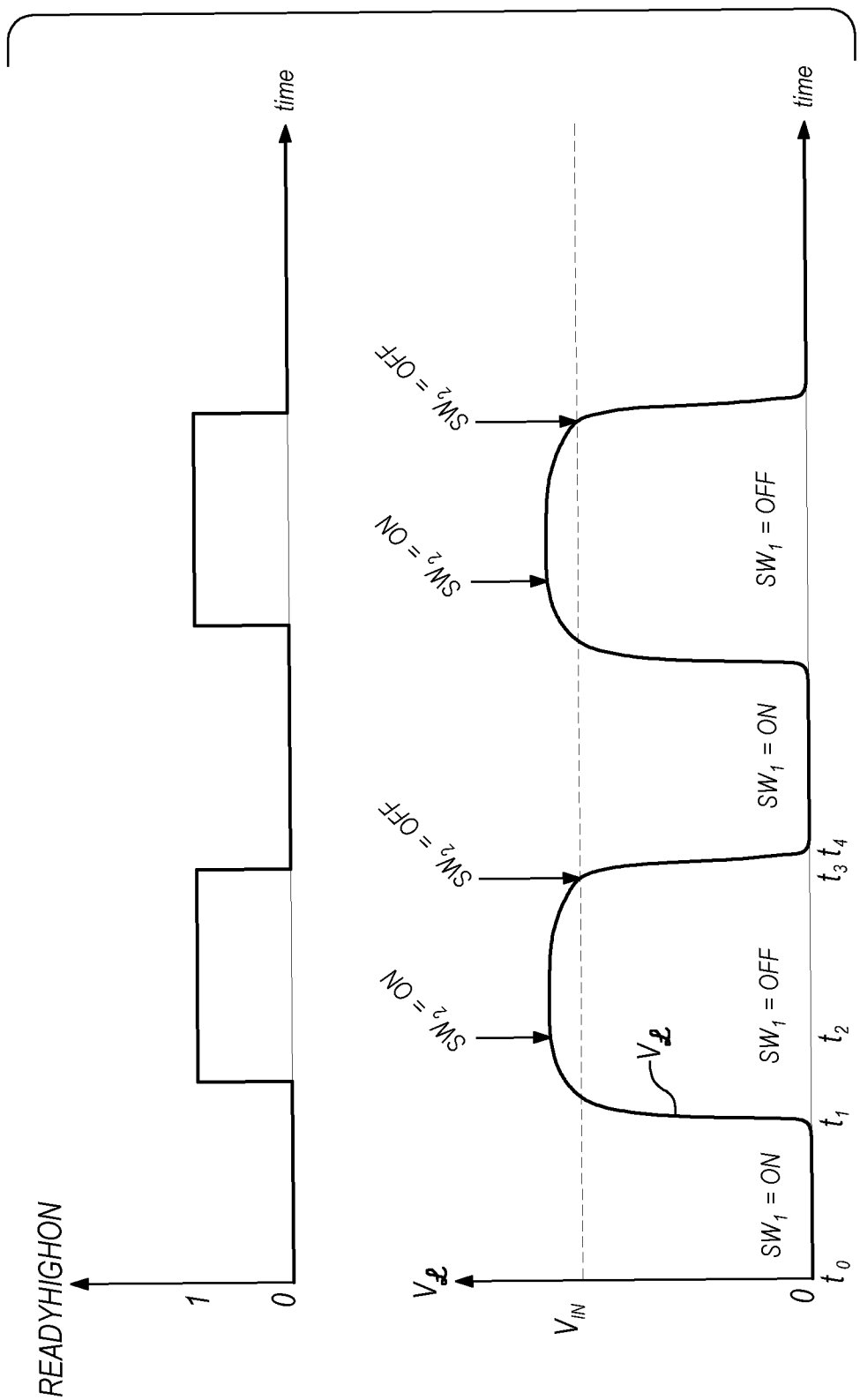
FIG. 7 illustrates a voltage waveform for a flyback converter in a high line, heavy load mode of operation (also referred to herein as "first" mode of operation) in accordance with an embodiment of the present invention.

FIG. 7 illustrates a voltage waveform for a flyback converter in a high line, heavy load mode of operation (also referred to herein as "first" mode of operation) in accordance with an embodiment of the present invention. The waveform represents the level of $V_s$ for two switching cycles. As shown in FIG. 7, the switch $SW_1$ is closed (ON) at time $t_0$ so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Current may then pass through the body diode of the switch $SW_2$ while energy from the transformer $T_1$ induces a current in the secondary winding of the transformer $T_1$ which charges the output capacitor $C_1$. Then, when the voltage $V_s$ has risen to become equal to $V_{IN}+V_{CSN}$, or nearly equal to $V_{IN}+V_{CSN}$, the switch $SW_2$ is closed (ON) at time $t_2$. This tends to equalize the level of $V_s$ towards that of $V_{IN}+V_{CSN}$, discharging the capacitor $C_{SN}$. The level of $V_s$ gradually falls. Then, at time $t_3$ the switch $SW_2$ is opened (OFF). The switch $SW_2$ can be opened while the level of $V_s$ is equal to or nearly equal to the level of $V_{IN}$. The voltage $V_s$ continues to fall more rapidly. And, at time $t_4$ the switch $SW_1$ is closed (ON). This causes the level of $V_s$ to fall to zero volts while a current again flows in the primary winding of the transformer $T_1$ and the above-described switching cycle repeats. Operation in this mode is comparable to that of FIG. 3 though the heavier loading may affect the resulting waveform of $V_s$.

FIG. 7 shows that the signal READYHIGHON transitions to a logic high voltage shortly before the time $t_2$ and then the signal READYHIGHON transitions to a logic low voltage shortly after the time $t_3$. Thus, the precise timing of closing and opening the high side switch $SW_2$ can be determined by monitoring $V_s$.

Figure 8:
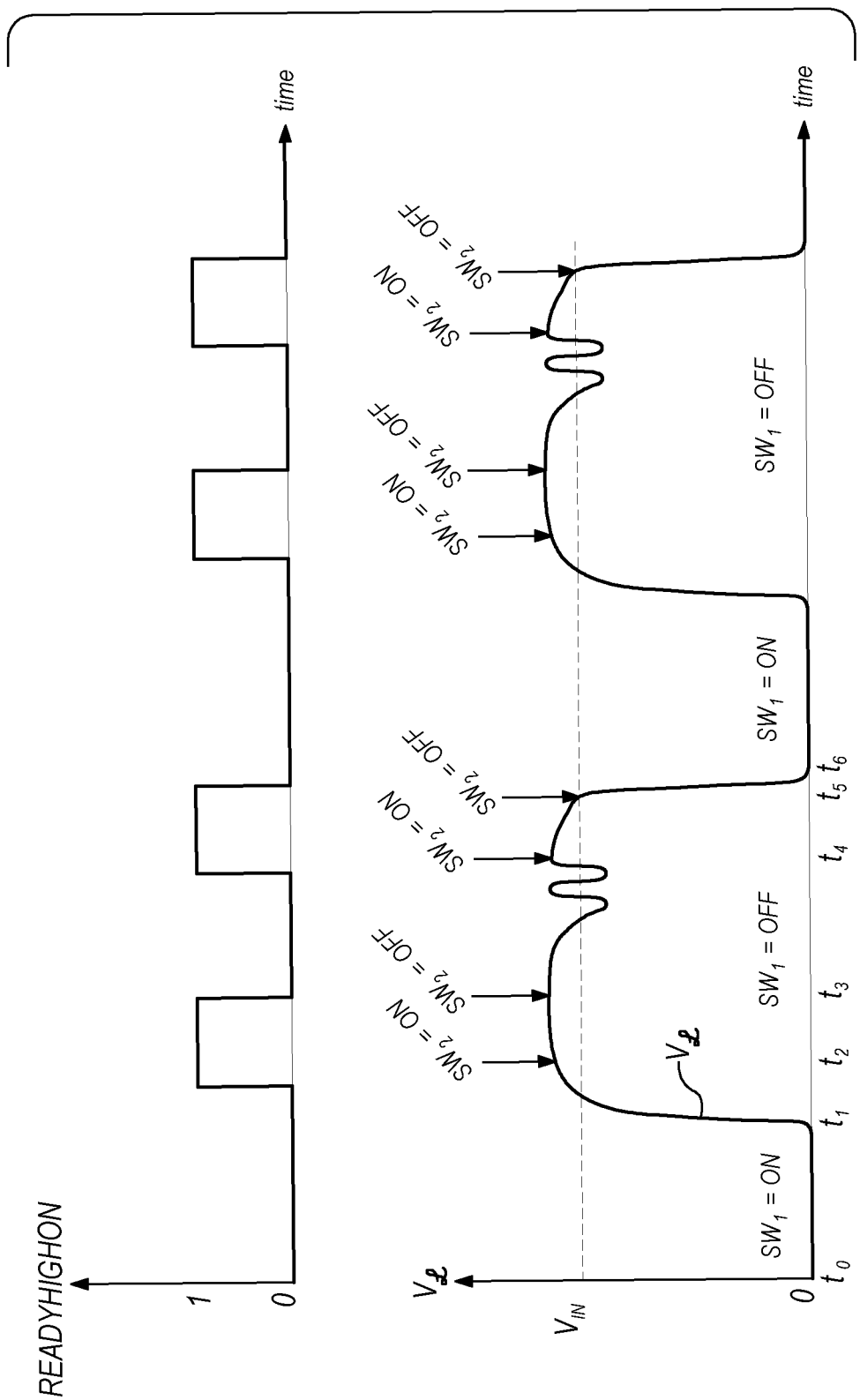
FIG. 8 illustrates a voltage waveform for a flyback converter in an alternative high line, heavy load mode of operation (also referred to herein as "combined" second and third mode of operation) in accordance with an embodiment of the present invention.

FIG. 8 illustrates a voltage waveform for a flyback converter in an alternative high line, heavy load mode of operation (also referred to herein as "combined" mode of operation) in accordance with an embodiment of the present invention. The waveform of FIG. 8 represents the level of $V_s$ for two switching cycles. As shown if FIG. 8, the switch $SW_1$ is initially closed (ON) at time to so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Then, when the voltage $V_s$ is rising and is equal to $V_{IN}+V_{CSN}$, or nearly equal to $V_{IN}+V_{CSN}$, the switch $SW_2$ is closed (ON) at time $t_2$. This equalizes the level of $V_s$ towards that of $V_{IN}+V_{CSN}$, discharging the capacitor $C_{SN}$. Then, at time $t_3$ the switch $SW_2$ is opened (OFF).

FIG. 8 also shows the signal READYHIGHON. Here, the signal READYHIGHON transitions to a logic high voltage shortly before the time $t_2$. This allows the precise timing of closing the high side switch $SW_2$ to be determined by monitoring $V_s$. Thus, $SW_2$ can be closed in accordance with ZVS. The signal READYHIGHON transitions to a logic low voltage at the time $t_3$ which causes the high side switch $SW_2$ to immediately open irrespective of the level of $V_s$. Accordingly, the high side switch $SW_2$ may be opened at the time $t_3$ under non-ZVS conditions.

The voltage $V_s$ then falls before rising again and oscillating in accordance with the resonant frequency of the primary side of the converter. Referring to FIG. 8, after the switch $SW_2$ is closed (at time $t_2$) and then opened (at time $t_3$), the level of $V_s$ falls and may also begin to oscillate. Shortly before the time $t_4$, the level of READYHIGHON transitions to a logic high voltage. When the level of $V_s$ is falling and is equal to, or very nearly equal to, the voltage $V_{IN}+V_{CSN}$, then the switch $SW_2$ can be closed for a second time during this same switching cycle. This is shown in FIG. 8 at time $t_4$. Then the switch $SW_2$ can be opened for a second time during this same switching cycle. This is shown in Figure at time $t_5$, when the level of $V_s$ is equal that of $V_{IN}$. Shortly after the time $t_5$, the level of READYHIGHON transitions to a logic low voltage. This second cycling of the high side switch $SW_2$ occurs while the low side switch $SW_1$ remains open. Therefore, the high side switch $SW_2$ is opened and closed twice during each switching cycle of the low side switch $SW_1$. The first cycle of the high side switch $SW_2$ can be terminated by the signal READYHIGHON as in the third mode of operation (rather than by monitoring $V_s$). The second cycle of the high side $SW_2$ is terminated based on monitoring the level of $V_s$.

Thus, similarly to FIG. 5, the READYHIGHON signal of FIG. 8 shows two windows of time during which the switch $SW_2$ has permission to be closed during each switching cycle. The first window commences when signal READYHIGHON transitions to a logic high voltage shortly before the time $t_2$. However, unlike FIG. 5, the first window preferably ends when the signal READYHIGHON transitions to a logic low voltage at the time $t_3$. This first window is comparable to the window of FIG. 6 (third mode). The second window commences when signal READYHIGHON transitions to a logic high voltage shortly before the time $t_4$. The first window ends when the signal READYHIGHON transitions to a logic low voltage shortly after the time $t_5$. This second window is comparable to the window of FIG. 4 (second mode). Thus, as shown by the two windows of time in FIG. 8, the switch $SW_2$ is given permission to be cycled (i.e. closed and opened) twice during each switching cycle of the low side switch $SW_1$.

Figure 9:
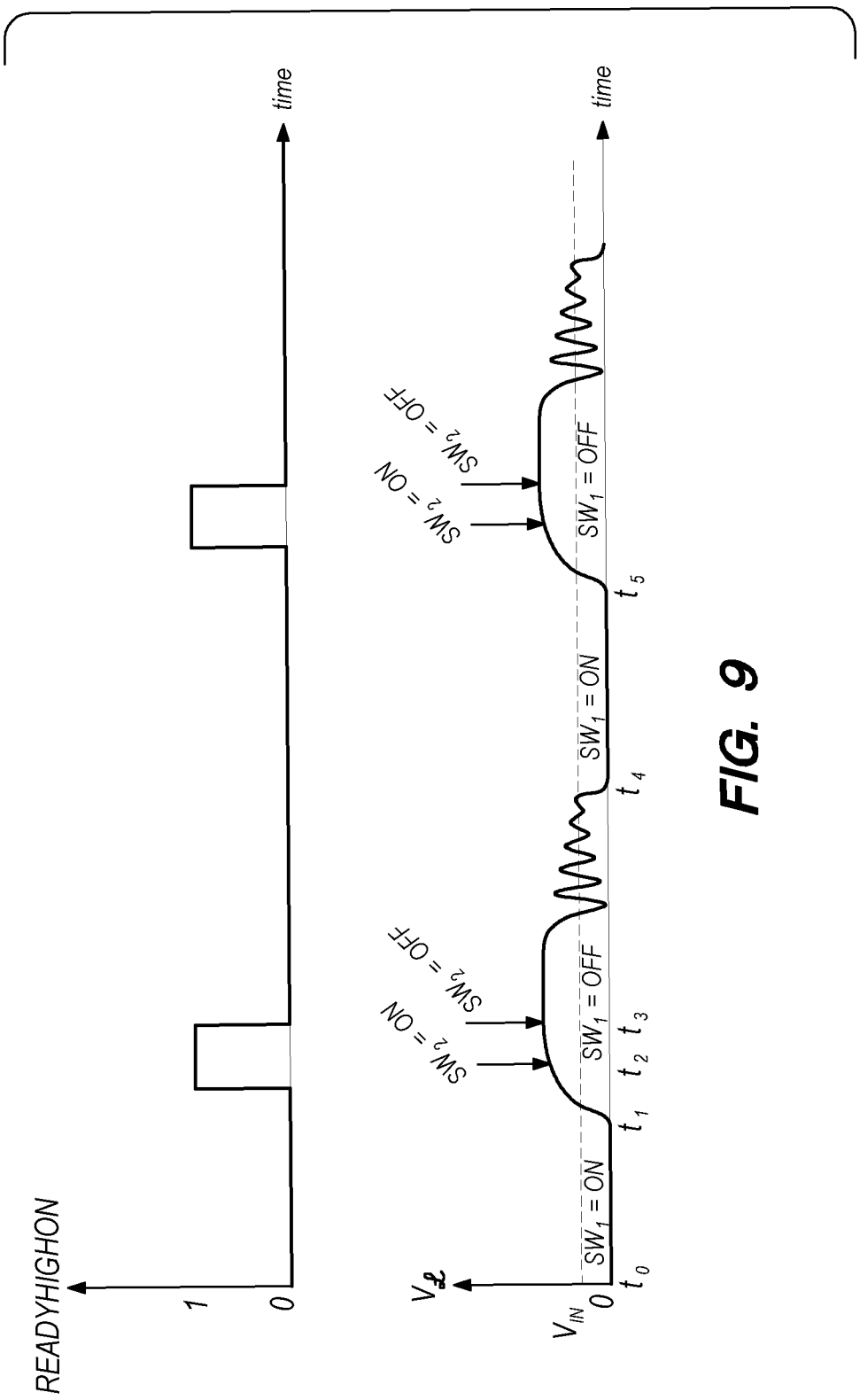
FIG. 9 illustrates a voltage waveform for a flyback converter in a low line, light load mode of operation (also referred to herein as "third" mode of operation) in accordance with an embodiment of the present invention.

FIG. 9 illustrates a voltage waveform for a flyback converter in a low line, light load mode of operation (also referred to herein as "third" mode of operation) in accordance with an embodiment of the present invention. This mode of operation of the high side switch $SW_2$ is comparable to that of FIG. 6. In this mode of operation, the high side switch $SW_2$ is closed based on monitoring the level of $V_s$ and is then opened without reference to, or monitoring of, the level of $V_s$. In this mode of operation, the high side switch is opened in response to a fixed or adjustable duration pulse signal (e.g., the signal READYHIGHON) while the low side switch $SW_1$ remains closed. As explained in connection with the exemplary waveform of FIG. 6, the duration of the time period $t_2$-$t_3$ illustrated in FIG. 9 can be dependent upon the level of $V_{IN}$. And, as shown in FIG. 9, the signal READYHIGHON transitions to a logic high voltage just prior to the time $t_2$. The high side switch $SW_2$ opens at the time $t_2$. Then, at the time $t_3$, the signal READYHIGHON transitions to a logic low voltage which causes the switch $SW_2$ to immediately open. Thus, the switch $SW_2$ can opened under non-ZVS conditions.

In an alternative of this mode of operation of the high side switch, the high side switch $SW_2$ is held off while the body diode of the high side switching transistor $SW_2$ performs rectification. This can be accomplished by withholding the READYHIGHON signal for the duration of the switching cycle.

Figure 10:
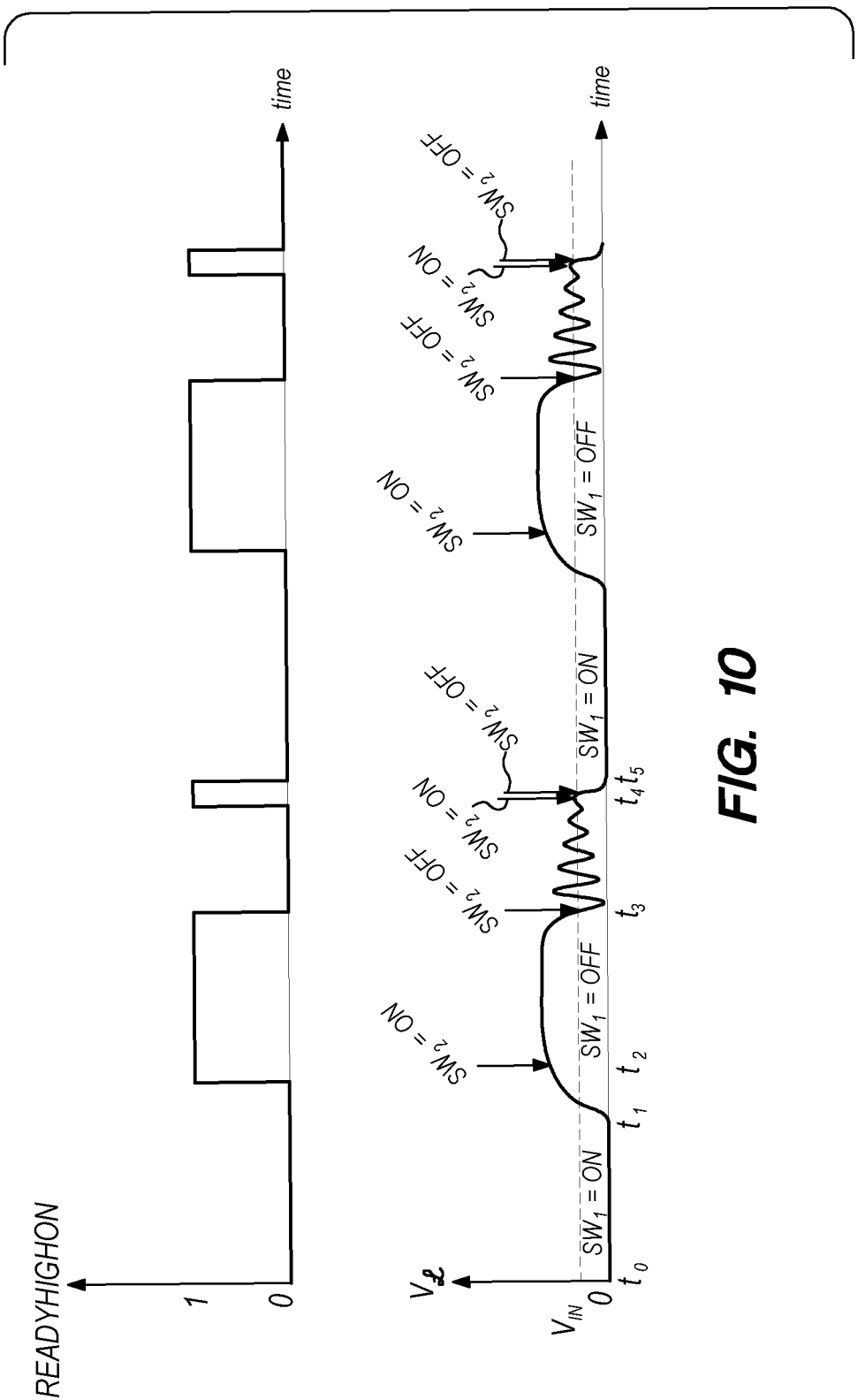
FIG. 10 illustrates a voltage waveform for a flyback converter in an alternative low line, light load mode of operation (also referred to herein as "combined" first and second mode of operation) in accordance with an embodiment of the present invention.

FIG. 10 illustrates a voltage waveform for a flyback converter in an alternative low line, light load mode of operation (also referred to herein as "combined" first and second mode of operation) in accordance with an embodiment of the present invention. This mode of operation of the high side switch $SW_2$ is comparable to that of FIG. 5. The waveform of FIG. 10 represents the level of $V_s$ for two switching cycles. As shown if FIG. 10, the switch $SW_1$ is initially closed (ON) at time to so that the level of $V_s$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_s$ rapidly rises to a level above that of $V_{IN}$. Then, when the voltage $V_s$ is rising and is equal to $V_{IN}+V_{CSN}$, or nearly equal to $V_{IN}+V_{CSN}$, the switch $SW_2$ is closed (ON) at time $t_2$. This equalizes the level of $V_s$ towards that of $V_{IN}+V_{CSN}$, discharging the capacitor $C_{SN}$. Then, at time $t_3$ the switch $SW_2$ is opened (OFF). The switch $SW_2$ can be opened while the level of $V_s$ is equal to the level of $V_{IN}$. The voltage $V_s$ then falls before rising again and oscillating in accordance with the resonant frequency of the primary side of the converter.

After the switch $SW_2$ is closed (at time $t_2$) and then opened (at time $t_3$), the level of $V_s$ falls and may also begin to oscillate. When the level of $V_s$ is falling and is equal to, or very nearly equal to, the voltage $V_{IN}+V_{CSN}$, then the switch $SW_2$ can be closed for a second time during this same switching cycle. This is shown in FIG. 10 at time $t_4$. Then the switch $SW_2$ can be opened for a second time during this same switching cycle. This is shown in Figure at time $t_5$, when the level of $V_s$ is equal that of $V_{IN}$. This second cycling of the high side switch $SW_2$ occurs while the low side switch $SW_1$ remains open. Therefore, the high side switch $SW_2$ is opened and closed twice during each switching cycle of the low side switch $SW_1$.

FIG. 10 also shows a signal waveform for the signal READYHIGHON. This waveform shows two windows of time during which the switch $SW_2$ has permission to be closed during each switching cycle. As in FIGS. 3 and 5, the first window commences when signal READYHIGHON transitions to a logic high voltage shortly before the time $t_2$. The first window ends when the signal READYHIGHON transitions to a logic low voltage shortly after the time $t_3$. The second window commences when signal READYHIGHON transitions to a logic high voltage shortly before the time $t_4$. The first window ends when the signal READYHIGHON transitions to a logic low voltage shortly after the time $t_5$. Thus, as shown by the two windows of time provided by the signal READYHIGHON in FIG. 10, the switch $SW_2$ is given permission to be closed and opened twice during each switching cycle of the low side switch $SW_1$. Additionally, the timing each of these two cycles of the switch $SW_2$ within each window can be based on monitoring $V_s$ and, therefore, ZVS can be maintained for both cycles.

FIG. 10 shows five oscillations occurring prior to the closing of switch $SW_2$. It will be apparent that greater or fewer oscillations can occur prior to the closing of switch $SW_2$.

Figure 11:
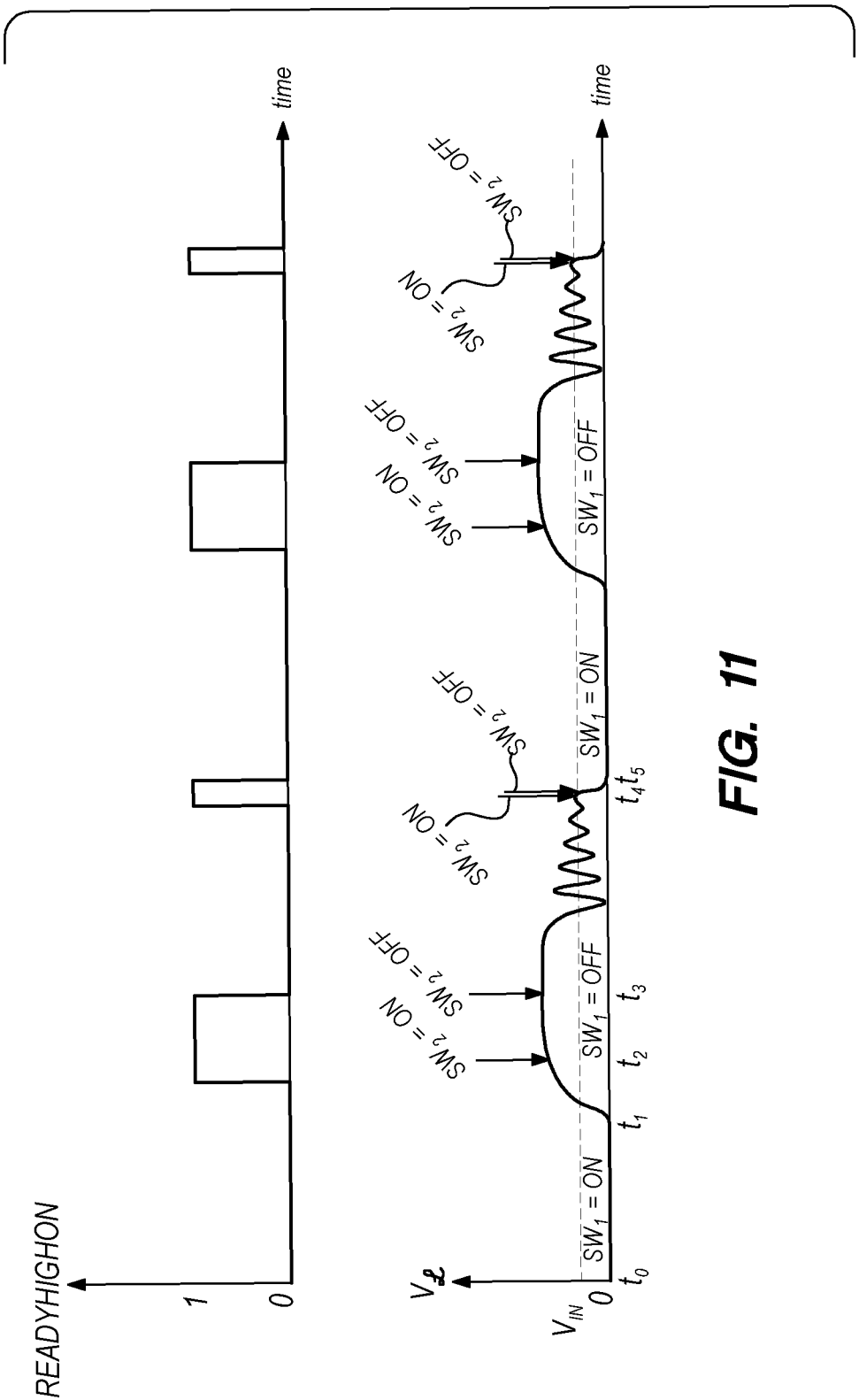
FIG. 11 illustrates a voltage waveform for a flyback converter in an alternative low line, light load mode of operation (also referred to herein as "combined" second and third mode of operation) in accordance with an embodiment of the present invention.

FIG. 11 illustrates a voltage waveform for a flyback converter in an alternative low line, light load mode of operation (also referred to herein as a "combined" second and third mode of operation) in accordance with an embodiment of the present invention. FIG. 11 differs from FIG. 10 in that the signal READYHIGHON in FIG. 11 transitions to a logic low voltage at the time $t_3$ which causes the high side switch $SW_2$ to immediately open. Therefore, the switch $SW_2$ may be opened at the time $t_3$ in accordance with non-ZVS conditions. In FIG. 11 the signal READYHIGHON transitions to a logic high voltage prior to the time $t_2$ so that the switch $SW_2$ may be closed based on monitoring the level of $V_s$ and in accordance with ZVS. Similarly to FIG. 10, the signal READYHIGHON transitions to a logic high voltage prior to the time $t_4$ and returns to a logic low voltage after the time $t_5$. Therefore, the precise timing for opening and closing the switch $SW_2$ in the second cycle of the switch $SW_2$ can be based on monitoring the level of $V_s$ and under ZVS conditions.

Figure 12:
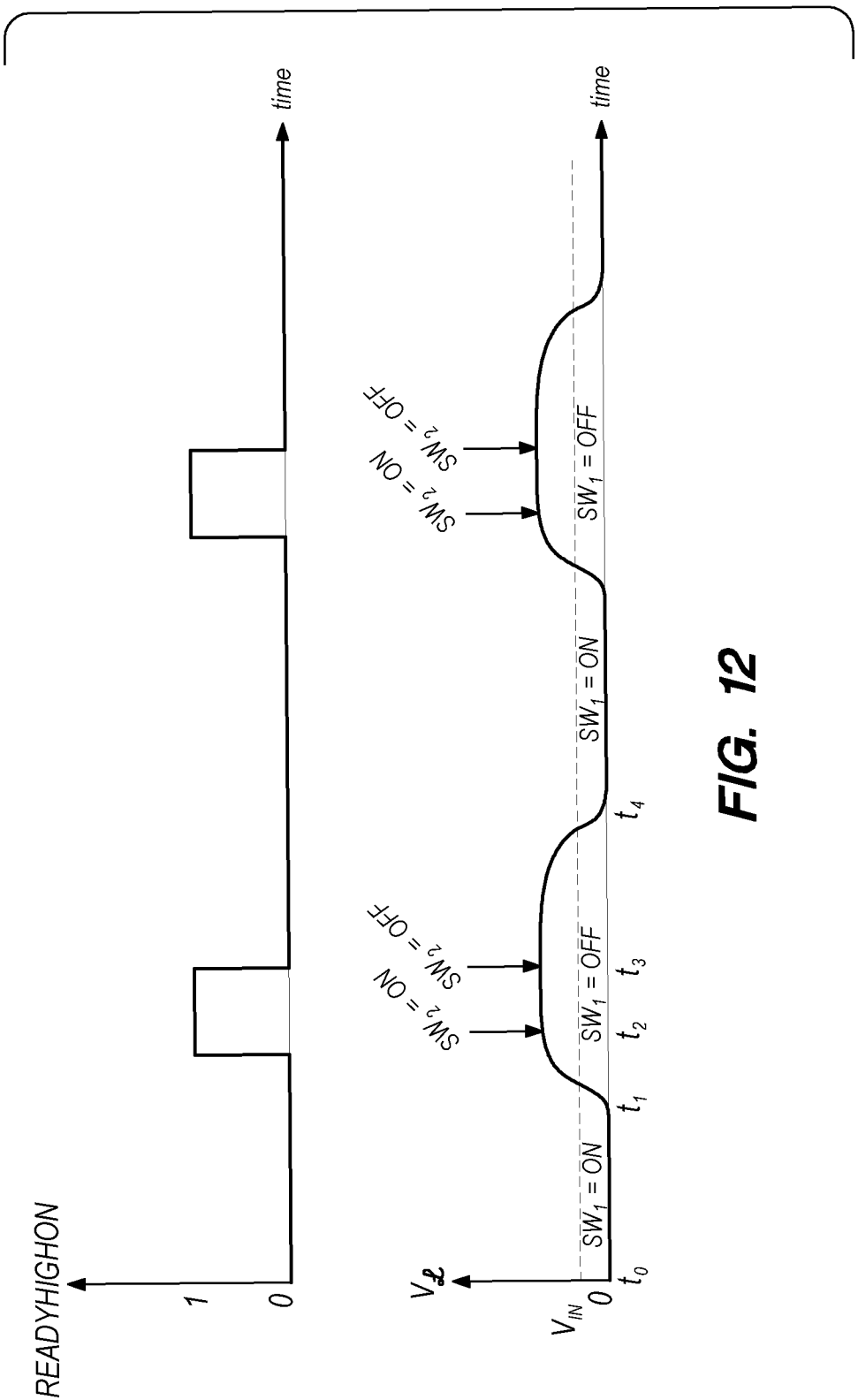
FIG. 12 illustrates a voltage waveform for a flyback converter in a low line, heavy load mode of operation (also referred to herein as "third" mode of operation) in accordance with an embodiment of the present invention.

FIG. 12 illustrates a voltage waveform for a flyback converter in a low line, heavy load mode of operation (also referred to herein as "third" mode of operation) in accordance with an embodiment of the present invention. This mode of operation of the high side switch $SW_2$ is comparable to that of FIGS. 6 and 9. In this mode of operation, the high side switch $SW_2$ is opened without reference to, or monitoring of, the level of $V_g$. In this mode of operation, the high side switch $SW_2$ can instead be opened in response to a level change in a fixed or adjustable duration pulse signal (e.g. the signal READYHIGHON) while the low side switch $SW_1$ remains closed. The duration of the period during which the high side switch is closed in this mode of operation is generally shorter than that the duration in which the high side switch is closed in other modes of operation (e.g. FIG. 3). As shown in FIG. 12, the signal READYHIGHON transitions to a logic high voltage shortly before the time $t_2$. Then, as soon as the level of $V_g$ is equal to, or very nearly equal to, the voltage $V_{IN}+V_{CSN}$, then the switch $SW_2$ can be closed. This occurs at the time $t_2$. The signal READYHIGHON transitions to a logic low voltage at the time $t_3$. This causes the high side switch $SW_2$ to be immediately opened. Therefore, the switch $SW_2$ remains closed during the time period between $t_2$ and $t_3$. As explained in connection with the exemplary waveform of FIGS. 6 and 9, the duration of the time period $t_2$-$t_3$ illustrated in FIG. 12 can be dependent upon the level of $V_{IN}$.

In an alternative of this mode of operation of the high side switch, the high side switch $SW_2$ is held off, while the body diode of the high side switching transistor still performs rectification. This can be accomplished by withholding the READYHIGHON signal for the duration of the switching cycle.

Figure 13:
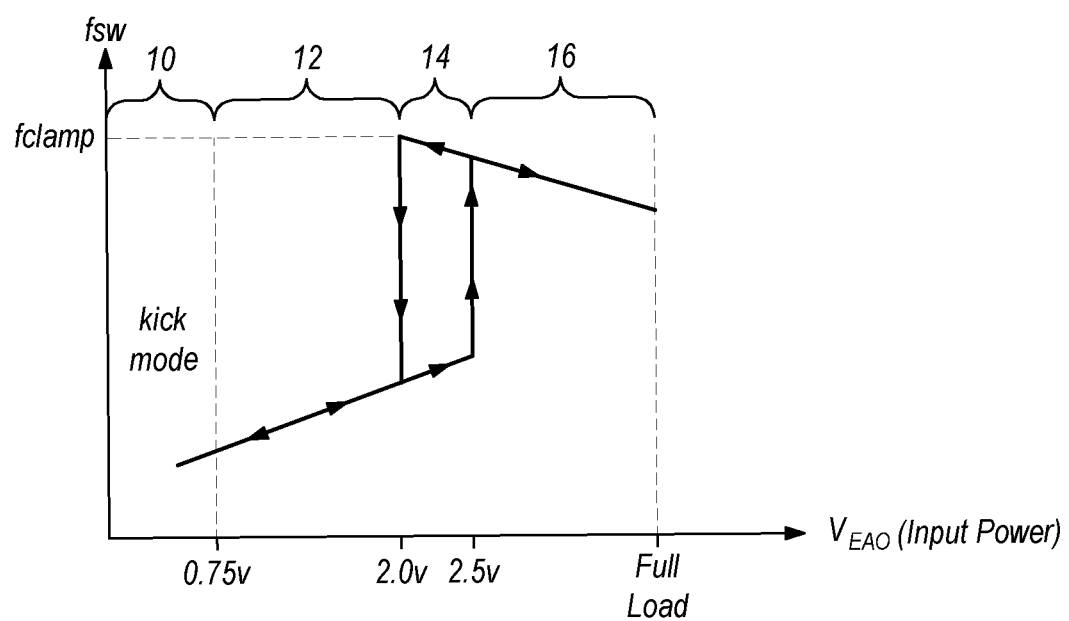
FIG. 13 illustrates a graph of switching frequency vs. input power for a flyback converter in accordance with an embodiment of the present invention.

FIG. 13 illustrates a graph of switching frequency vs. input power for a flyback converter in accordance with an embodiment of the present invention. Switching frequency $f_{sw}$, is plotted on the vertical axis while input power, as measured by the feedback error signal $V_{EAO}$ (e.g., FIG. 14) is plotted on the horizontal axis. As shown in FIG. 13, the flyback converter can operate in different regions of operation dependent upon load power: (1) a very light loading region of operation 10; (2) a light loading region of operation 12; (3) a transitional loading region of operation 14; and (4) a heavy loading region of operation 16. While four regions 10, 12, 14, and 16 of operation are illustrated based on loading, it will be apparent that more or fewer regions can be implemented.

When the feedback error signal $V_{EAO}$ is below a low threshold, for example, 0.75 volts, this indicates very light loading. In this region of operation 10, the flyback converter can be operated in "burst" or "kick" mode. In such a mode, switching (of switches $SW_1$ and $SW_2$) can be paused between "bursts" of switching for increased efficiency. Once the level of $V_{EAO}$ rises above the low threshold, the flyback converter enters the light loading region of operation 12. In this region 12, the flyback converter can be operated in frequency control mode in which the switching frequency (of the low side switch $SW_1$) is modulated in a feedback loop to regulate the output voltage $V_O$. Once the level of $V_{EAO}$ surpasses a medium threshold of, for example, 2.0 volts, then the flyback converter enters the transitional loading region 14. In this region 14, operation in frequency control mode can continue until the level of $V_{EAO}$ surpasses a high threshold of, for example, 2.5 volts.

Once the level of $V_{EAO}$ surpasses the high threshold of, for example, 2.5 volts, then the flyback converter enters heavy loading region of operation 16. In this region 16, the switching frequency and is clamped to predetermined value $f_{clamp}$ and the flyback converter enters a current control mode. In the current control mode, the peak current level (in the transformer $T_1$ primary winding) for each switching cycle, as sensed by a current sensing signal Isense (e.g. FIG. 14) is controlled in a feedback loop to regulate the output voltage $V_O$. As the power level rises, the switching frequency can additionally be reduced, as shown in FIG. 13 by the downward sloping line in the regions 14 and 16. As the power level approaches full load, voltage regulation is still preferably performed primarily through the current control feedback loop.

As shown in FIG. 13, the switch frequency vs. power curve is discontinuous. When transitioning from frequency control to current control (e.g., when $V_{EAO}$ rises above 2.5 volts), the switching frequency is suddenly increased and the peak current in the transformer primary winding is, at the same time, reduced. Conversely, when transitioning from current control to frequency control (e.g., when $V_{EAO}$ falls below 2.0 volts), the switching frequency is suddenly reduced and the peak current in the transformer primary winding is, at the same time, increased. In both modes, negative feedback is employed to regulate the output voltage $V_O$. It is therefore important that operation of the flyback converter remains stable as it transitions between the frequency and current control modes of operation.

The switch frequency vs. power curve of FIG. 13 shows hysteresis in the transitions between frequency control and current control. That is, once the level of $V_{EAO}$ rises above 2.5 volts and the switching converter transitions from the frequency control mode to the current control mode, the level of $V_{EAO}$ must then fall below 2.0 volts in order to return to the frequency control mode. Similarly, once the level of $V_{EAO}$ falls below 2.0 volts and the switching converter transitions to the frequency control mode from the current control mode, the level of $V_{EAO}$ must then rise above 2.5 volts in order to return to the current control mode. It will be apparent that the transition levels of 2.0 volts and 2.5 volts are exemplary and different levels could be selected.

Still referring to FIG. 13, in the very light loading region 10 and the light loading region 12, the flyback converter preferably operates in accordance with DCM. Under these loading conditions (e.g., in regions 10 and 12 of FIG. 13), the high side switch $SW_2$ can be operated in accordance with the first mode of operation of the high side switch $SW_2$ (as in FIG. 3), or in accordance with the second mode of operation (as in FIG. 4) or in accordance with both the first and second modes of operation of the high side switch $SW_2$ (the first and second modes being operative together as in FIG. 5) or in accordance with the third mode of operation (as in FIG. 6). Selection among the above-described modes of operation can be made, for example, experimentally according to which mode results in highest overall efficiency and which avoids overcharging the snubber capacitor $C_{SN}$. For example, the above-described alternatives may assume "high line" conditions are present. However, under low line and light load conditions, it may be expected that the third mode (as in FIG. 9) or the combined first and second modes (as in FIG. 10) may be optimal. Under low line conditions and light load conditions, operation may be in accordance with the combined second and third modes (as in FIG. 11).

In an embodiment, under heavy loading conditions (e.g., in region 16 of FIG. 13), the switching power supply is preferably operated in accordance with CRM. Under heavy loading and "high line" conditions, the high side switch can, for example, be operated in accordance with the first mode of operation of the high side switch $SW_2$ (as in FIG. 7) or in accordance with the combined mode of operation (as in FIG. 8). Under heavy loading and "low line" conditions, the high side switch can, for example, be operated in accordance with the third mode of operation of the high side switch $SW_2$ (as in FIG. 12).

In an embodiment, under transitional loading conditions (as in region 14 of FIG. 13), where the loading level is between the light and heavy loading conditions, the switching power supply can be operated in DCM or CRM. Whether the switching power supply operates in DCM or CRM may depend, for example, upon whether operation just prior to entering the region 14 was DCM or CRM. More particularly, if the operation prior to entering the region 14 was DCM then DCM operation may continue in the region 14 until the error signal exceeds 2.5 volts. Conversely, if the operation prior to entering the region 14 was CRM then CRM operation may continue in the region 14 until the error signal falls below 2.0 volts Also, under transitional loading conditions, the high side switch is preferably operated in accordance with the second mode of operation of the high side switch (as in FIG. 4 or 5). Similarly, the mode of operation in the transitional region 14 may remain the same as it was prior to entering the transitional region 14 until the load power crosses to the opposite side the transitional region 14. More particularly, the mode of operation present in region 16 may continue into region 14 until load power crosses into region 12. Conversely, the mode of operation present in region 12 may continue into region 14 until load power crosses into region 16.

The waveforms of FIGS. 3 through 12 apply equally to the current control and frequency control modes, though the time scale will change, dependent upon the mode of operation.

Figure 14:
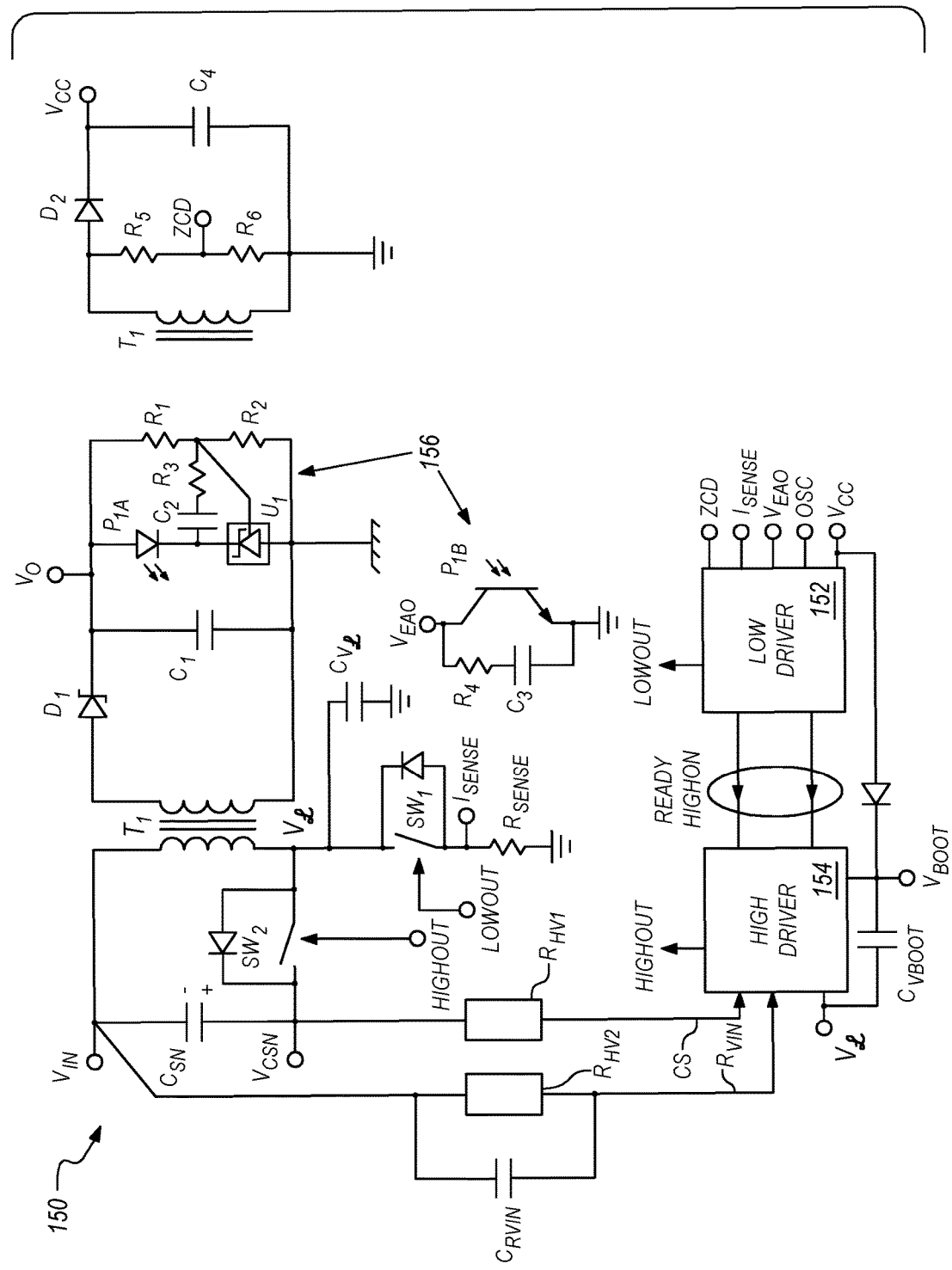
FIG. 14 illustrates a flyback converter and control circuitry in accordance with an embodiment of the present invention.

FIG. 14 illustrates a flyback converter 150 and control circuitry in accordance with an embodiment of the present invention. The flyback converter 150 of FIG. 2 is shown in FIG. 14 along with an embodiment of control circuitry and an embodiment of a second output stage. The flyback converter 150 and control circuitry of FIG. 14 are preferably configured to control the high side switch $SW_2$ and the low side switch $SW_1$. In particular, a "low driver" controller 152 generates a signal LOWOUT that controls (i.e. opens and closes) the low side switch $SW_1$. The low driver controller 152 can control the switch $SW_1$ using frequency control and/or peak current control in a feedback loop so as to regulate the output voltage $V_O$, as described herein. The low driver controller 152 preferably also generates the signal READYHIGHON described herein. A "high driver" controller 154 generates a signal HIGHOUT that controls (i.e. opens and closes) the high side switch $SW_2$ based on the monitored levels of $V_{\tilde{s}}$ and $V_{IN}$, and based on the signal READYHIGHON, as described herein.

As shown in FIG. 14, a resistive divider and photo-couple network 156 is coupled to the flyback converter 150 output and includes resistors $R_1$, $R_2$, and $R_3$, capacitor $C_2$, photo-diode $P_{1A}$, and shunt regulator $U_1$. The photo-diode $P_{1A}$ is optically coupled to phototransistor $P_{1B}$. The phototransistor $P_{1B}$ is coupled to a compensation resistor $R_4$ and capacitor $C_3$. A voltage signal $V_{EAO}$ is generated across the compensation resistor $R_4$ and capacitor $C_3$. The signal $V_{EAO}$ is representative of an error signal (a difference between the level of $V_O$ and a desired level for $V_O$) and is also representative of a level of input power to the flyback converter 150. The signal $V_{EAO}$ is electrically isolated from the output voltage $V_O$ and is instead referenced to the ground level of the primary side of the transformer $T_1$.

The transformer $T_1$ can include a second secondary winding. As shown in FIG. 14, a first terminal of the second secondary winding of the transformer $T_1$ is coupled to an anode of a diode $D_2$. A cathode of the diode $D_2$ is coupled to a first terminal of a capacitor $C_4$. A second terminal of the second secondary winding of the transformer $T_1$ is coupled to a second terminal of the capacitor $C_4$ and to the first ground node. A voltage VCC is formed across the capacitor $C_4$ and can be used for powering control circuitry of the flyback converter 150. A resistive divider includes resistors $R_5$ and $R_6$ and generates a voltage signal ZCD that is representative of the level of $V_{CC}$. The signal ZCD is also representative of the level of $V_{\tilde{s}}$.

As also shown in FIG. 14, a first terminal of a capacitor $C_{V\tilde{s}}$ is coupled to the node between the high side switch $SW_2$ and the low side switch $SW_1$. A second terminal of the capacitor $C_{V\tilde{s}}$ is coupled to the first ground node. The capacitor $C_{V\tilde{s}}$ tends to smooth the $V_{\tilde{s}}$ signal waveform. Additionally, a current sensing resistor $R_{SENSE}$ is coupled between the second terminal of the transistor switch $SW_1$ and the first ground node. A current sensing signal $I_{SENSE}$ is formed across the resistor $R_{SENSE}$.

The low driver controller 152 receives as inputs the signals ZCD, $I_{SENSE}$, WA° as well as an oscillator signal OSC and uses these signals to generate the signal LOWOUT for controlling the transistor switch $SW_1$ as explained herein. The signal $V_{EAO}$ represents the load power and is used to regulate the output voltage in a feedback loop based on either peak current control or switching frequency control. The signal $I_{SENSE}$ represents the current in the transformer $T_1$ and is used to the control peak current in the transformer primary winding during switching. The oscillator signal OSC is used for controlling the timing of switching. The signal ZCD is representative of the level of $V_{\tilde{s}}$ and is used to turn on the switch $SW_1$.

The low driver controller 152 generates a differential signal READYHIGHON which is used by the high driver controller 154 for controlling the transistor switch $SW_2$ as explained herein. The signal READYHIGHON informs the high driver controller 154 that it can (i.e. has permission to) turn on the switch $SW_2$, though the high driver controller 154 generally determines the timing of turning on the switch $SW_2$. The signal READYHIGHON is preferably a differential signal because the low driver controller 152 and the high driver controller 154 preferably have different ground reference nodes. In particular, the low driver controller 152 is referenced to the first ground node, whereas, the high driver controller 154 preferably uses the voltage $V_{\tilde{s}}$ as its ground reference.

As also shown in FIG. 14, a first terminal of a first high-voltage resistor $R_{HV1}$ is coupled to the second terminal of the capacitor $C_{SN}$. A second terminal of the resistor $R_{HV1}$ is coupled to the high driver controller 154. This provides the high driver controller 154 with a signal CS that is representative of the voltage $V_{CSN}$. A first terminal of a second high-voltage resistor $R_{HV2}$ is coupled to the input voltage $V_{IN}$. A second terminal of the resistor $R_{HV2}$ is coupled to the high driver controller 154. A capacitor $C_{RVIN}$ is preferably coupled in parallel with the resistor $R_{HV2}$. This provides the high driver controller 154 with a signal $R_{VIN}$ that is representative of the voltage $V_{IN}$. The capacitor $C_{RVIN}$ helps in smoothing the signal $R_{VIN}$ particularly at light loads. The voltage $V_{\tilde{s}}$ signal is also coupled to the high driver controller 154. The high driver controller 154 uses the signals $R_{VIN}$, CS, $V_{\tilde{s}}$, and READYHIGHON to generate the signal HIGHOUT that controls (i.e. opens and closes) the switch $SW_2$ as explained herein. For example, when $V_{\tilde{s}}$ is greater than $V_{IN}$ and CS is substantially equal to $V_{\tilde{s}}$, the high driver controller 154 turns on the switch $SW_2$. The switch $SW_2$ generally stays on until $V_{\tilde{s}}$ is substantially equal to $V_{IN}$ and then the switch $SW_2$ is turned off though, as explained herein, the time instant at which the switch $SW_2$ is turned on and off can also be dependent upon other factors, such as the level of the input voltage $V_{IN}$. The switch $SW_2$ can also be turned off when the signal READYHIGHON is deactivated.

Also shown in FIG. 14, the voltage $V_{CC}$ can be used as a power supply for powering elements of the low driver controller 152. A voltage $V_{BOOT}$ can be used as a power supply for powering elements of the high driver controller 154. The voltage $V_{BOOT}$ can be obtained by drawing current from $V_{CC}$, for example, via a diode which then charges a capacitor $C_{VBOOT}$. The voltage $V_{BOOT}$ can also be used to indicate a level of loading of the power converter 150 as explained herein.

An exemplary switching cycle is performed as follows. The low side switch $SW_1$ is turned on. Then, once the peak current in the primary winding of the transformer $T_1$ is reached, as indicated by the current sensing signal $I_{SENSE}$, the low side switch $SW_1$ is turned off. The peak current depends on the level of $V_{EAO}$: (1) when $V_{EAO}$ is less than a threshold (e.g. 2.5 volts), then the flyback converter is in frequency control mode and the peak current is essentially a fixed value (though the peak current is preferably gradually reduced as $V_{EAO}$ falls in order to increase efficiency and inhibit audible noise in burst mode); (2) when $V_{EAO}$ is greater than the threshold (e.g. 2.5 volts), then the flyback converter is in current control mode and the peak current depends on $V_{EAO}$ (and the switching frequency is clamped). Once the low side switch $SW_1$ turns off, the voltage $V_s$ flys up, eventually reaching a level above the input voltage $V_{IN}$. The low side driver 152 then activates sending the READYHIGHON signal to the high side driver 154. The READYHIGHON signal is activated at a time that depends upon the switching frequency and other factors. After receiving the READYHIGHON signal, the high side driver 154 determines that $V_s$ is greater than $V_{IN}$ by an appropriate margin and, in response, the high side driver 154 turns on the high side switch $SW_2$. The high side switch $SW_2$ remains on for a period of time, e.g., until the level of $V_s$ falls to the level of $V_{IN}$, or until the signal READYHIGHON is deactivated, at which time, high side driver 154 turns off the high side switch $SW_2$. The time instant at which the high side driver 154 turns off the high side switch $SW_2$ can also be adjusted according to a level of $V_{IN}$ as explained herein. More particularly, the high side switch $SW_2$ can be opened before $V_s$ falls to the level of $V_{IN}$ by an amount that depends on the level of $V_{IN}$. When the level of $V_s$ falls to zero, the low side switch $SW_1$ can be turned on again.

For the third mode of operation (e.g., FIGS. 6, 8, 9 and 11-12), the READYHIGHON signal can serve as the pulse signal that the high driver 154 uses to open the high side switch $SW_2$. For example, the high driver 154 can be configured to open the switch $SW_2$ based only on the signal READYHIGHON without reference to, or monitoring of, the level of $V_s$. In this mode, the high side switch $SW_2$ can be held open for a pre-determined time period or for an adjustable time period. For example, the high side switch $SW_2$ can be closed at a time that depends upon a monitored level of $R_{VIN}$ (and therefore the level of $V_{IN}$). In this case, the duration of the pulse signal is dependent upon the level of $V_{IN}$. Additionally, the duration of the pulse signal can be adjusted by adjusting the resistance value of the resistor $R_{HV2}$. In this "third" mode of operation, the low driver controller 152 may generate the READYHIGHON signal while the high driver controller 154 may not use the level of $V_s$ to control the opening of the high side switch $SW_2$. Therefore, it is the low driver controller 152 that controls the timing of opening the switch $SW_2$, rather than the high driver controller 154. The low driver controller 152 does this by initiating the READYHIGHON pulse signal that the high driver 154 then uses to open the high side switch $SW_2$. This indirect control of the high side switch $SW_2$ may result in non-ZVS operation but with improved efficiency.

The alternative of the third mode of operation of the high side switch, in which the high side switch $SW_2$ is held off while the body diode of the high side switching transistor $SW_2$ still performs rectification, can be implemented similarly by the high driver 154 being configured to open the switch $SW_2$ only when the signal READYHIGHON is active (i.e. a logic high voltage). However, in this alternative third mode of operation, the low driver 152 can withhold the READYHIGHON signal, thereby, causing the high driver 154 to hold the high side switch $SW_2$ off. In this case, the body diode of the high side switch $SW_2$ performs rectification passively. This alternative third mode operation may therefore also be initiated by the low driver controller 152.

Figure 15:
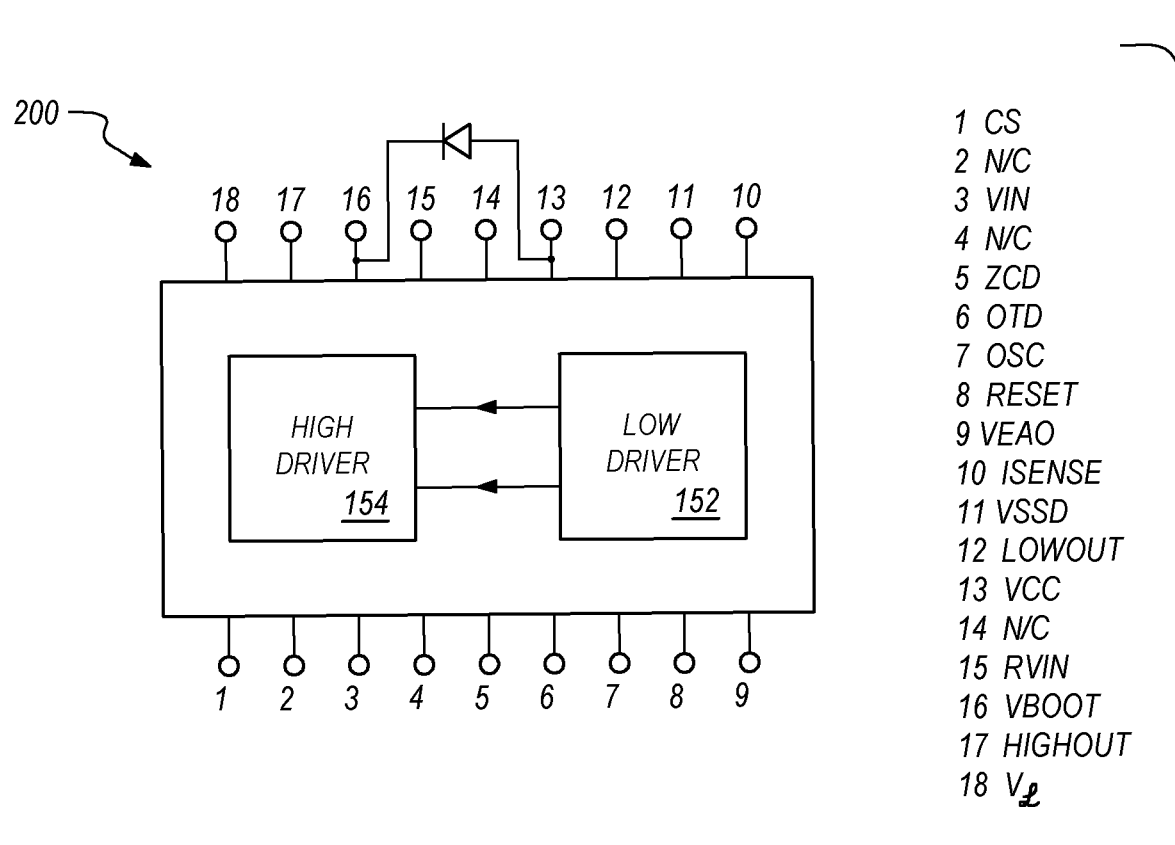
FIG. 15 illustrates a controller integrated circuit for a DC-to-DC converter in accordance with an embodiment of the present invention.

FIG. 15 illustrates a controller integrated circuit (IC) for a DC-to-DC converter in accordance with an embodiment of the present invention. In a preferred embodiment, the IC controller is implemented as an IC package 200 that includes the low driver controller 152 as a first monolithic IC chip and the high driver 154 as a second monolithic IC chip, both included in the same 18-pin IC package. In an embodiment, the switch $SW_2$ is integrated into the high driver controller 154 IC chip. Also, in an embodiment, the resistors $R_{HV1}$ and $R_{HV2}$ is included in the IC package. One or both of the resistors $R_{HV1}$ and $R_{HV2}$ can be integrated into the high driver controller 154 IC chip. Further, the resistor $R_{HV2}$ can be partially integrated into the high driver controller 154 IC chip. As explained herein, each of the two IC chips has a different ground reference. Communication between the two chips is via the differential signal READYHIGHON.

FIG. 15 shows signals assigned to each of the 18 pins:
Pin 1 CS
Pin 2 N/C
Pin 3 $V_{IN}$
Pin 4 N/C
Pin 5 ZCD
Pin 6 OTP
Pin 7 OCS
Pin 8 RESET
Pin 9 $V_{EAO}$
Pin 10 $I_{SENSE}$
Pin 11 $V_{SSD}$
Pin 12 LOWOUT
Pin 13 $V_{CC}$
Pin 14 N/C
Pin 15 $R_{VIN}$
Pin 16 $V_{BOOT}$
Pin 17 HIGHOUT
Pin 18 $V_s$ Pin 2, pin 4, and pin 14 are not used and are labeled "N/C" or "no connection." A diode is connected between pin 13 and pin 16. OTP can be an over-temperature protection pin that provides a current to an external thermistor, the voltage on which can then be compared to a reference, such as 1.0 volt, to detect an over-temperature condition. $V_{SSD}$ is a ground pin. A reset pin RESET can be used to reset the ICs of the package after entering a protection mode. The reset can be accomplished by pulling the RESET pin to a voltage that is less than a reference voltage such as 2.5 volts.

Figure 16:
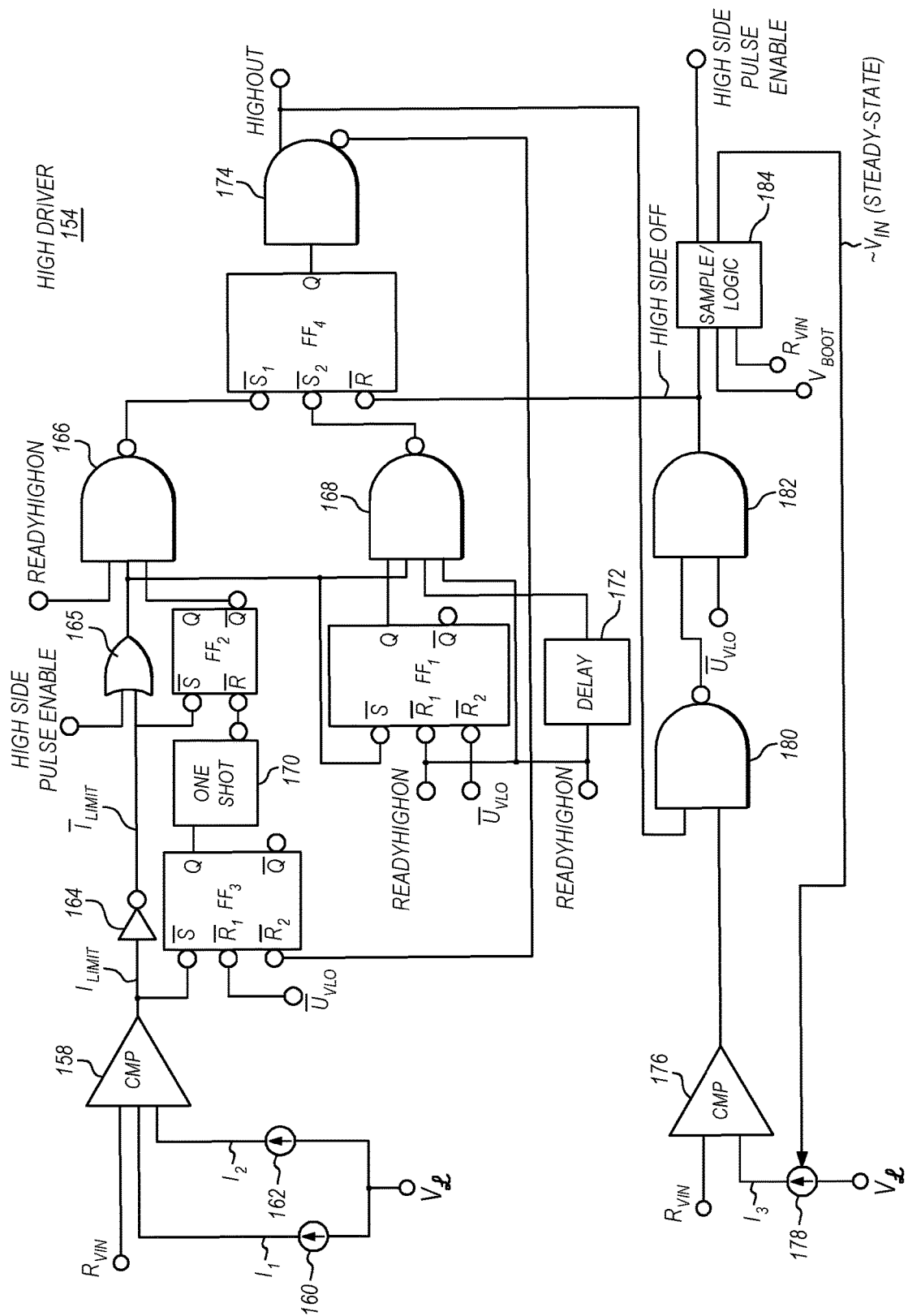
FIG. 16 illustrates a high side driver control circuitry for a flyback converter in accordance with an embodiment of the present invention.

FIG. 16 illustrates control circuitry of the high driver 154 in accordance with an embodiment of the present invention. A signal $R_{VIN}$, which represents the input supply voltage $V_{IN}$, is compared by a comparator 158 to a pair of reference currents $I_1$ and $I_2$ which are generated by current sources 160 and 162, respectively. The current sources 160 and 162 are coupled to $V_{\underline{s}}$ as a reference voltage. In an embodiment, the current $I_1$ is set to 2 µA (2 microamps) while the current $I_2$ is set to 60 µA (60 microamps). The signals at the input of the comparator 158 may additionally be adjusted, for example, in order to compensate for signal path delays during high-frequency operation.

The output of the comparator 158 is logic signal $I_{LIMIT}$. $I_{LIMIT}$ is a first logic level when the level of current received by the comparator 158 from $R_{VIN}$ is between the levels of $I_1$ and $I_2$ and, otherwise, $I_{LIMIT}$ is a second logic level. The signal $I_{LIMIT}$ is used to control the timing of turning on the high side switch $SW_2$. More particularly, the $R_{VIN}$ current level must be between the levels of $I_1$ and $I_2$ in order for the high side switch $SW_2$ to be turned on during a switching cycle (and the signal READYHIGHON must be activated). The comparator 158 is therefore a window comparator whose output indicates whether or not the $R_{VIN}$ current signal is between the levels of $I_1$ and $I_2$. The comparator 158 determines that $V_{\underline{s}}$ is greater than $V_{IN}$ by an appropriate margin and, in response to this determination, the high side driver 154 turns on the high side switch $SW_2$. Thus, the window of comparison implemented by comparator 158 determines the timing for turning on $SW_2$ (shown at time $t_2$ in FIGS. 3 and 4). Providing a window for comparison helps to counter effects of noise associated with high rates of signal change and accommodates parasitic capacitance of the $R_{VIN}$ resistor $R_{VH2}$ (FIG. 2) and avoids changing the logic level of $I_{LIMIT}$ at the moments when $V_{IN}$ and $V_{\tilde{s}}$ are crossing each other (when one is rising and the other is falling and vice-versa).

The output of the comparator 158 is inverted by an inverter 164 to form a logic signal $I_{LIMIT}$-bar. The signal $I_{LIMIT}$-bar is coupled to an input of a NAND gate 166 via logic OR gate 165, to an inverted set input S-bar of a flip-flop $FF_1$, to an input of a NAND gate 168 and to an inverted set input S-bar of a flip-flop $FF_2$. The signal $I_{LIMIT}$ is coupled to an inverted set input S-bar to a flip-flop $FF_3$. An output Q of the flip-flip $FF_3$ is coupled to an input of a one-shot circuit 170. An inverted output of the one-shot circuit 170 is coupled to an inverted reset input R-bar to the flip-flop $FF_2$. An inverted output Q-bar of the flip-flop $FF_2$ is coupled to an input of the NAND gate 166.

The signal READYHIGHON is coupled to an input of the NAND gate 166, to a first inverted reset input $R_1$-bar to the flip-flop $FF_1$, to an input of a delay 172 and to an input of the NAND gate 168. An inverted under-voltage lockout signal $U_{VLO}$-bar is coupled to a first inverted reset input $R_1$-bar to the flip-flop $FF_3$ and to second inverted reset input $R_s$-bar to the flip-flop $FF_1$. An output Q of the flip-flop $FF_1$ is coupled to an input of the NAND gate 168. An output of the delay 168 is coupled to an input of the NAND gate 168.

An output of the NAND gate 166 is coupled to a first inverted set input $S_1$-bar of a flip-flop $FF_4$. An output of the NAND gate 168 is coupled to a second inverted set input $S_2$-bar of the flip-flop $FF_4$. An output Q of the flip-flop $FF_4$ is coupled to an input of an AND gate 174. An inverted output of the gate 174 is coupled to a second inverted reset input to the flip-flop $FF_3$. A non-inverted output of the gate 174 forms the signal HIGHOUT. The generated signal HIGHOUT is used to control the switch $SW_2$.

The signal $R_{VIN}$ is also compared by a comparator 176 to a current $I_3$. The current $I_3$ is generated by an adjustable current source 178. The current source 178 is coupled to $V_{\underline{s}}$ as a reference voltage. The current $I_3$ is adjusted based on the level of $V_{IN}$. The output of the comparator 176 is coupled to a first input of a NAND gate 180. The signal HIGHOUT is coupled to a second input to the NAND gate 180. An output of the NAND gate 180 is coupled to a first input of a NAND gate 182. The inverted under-voltage lockout signal $U_{VLO}$-bar is coupled to a second input of the NAND gate 182. An output of the NAND gate 182 is coupled to an inverted reset input R-bar to the flip-flop $FF_4$ and to a first input to a sample/logic circuit 184.

The signal $R_{VIN}$ is coupled to a second input of the sample/logic circuit 184. The NAND gate 182 generates a signal High Side Off, which is used by the sample/logic circuit 184 for sampling $V_{IN}$. More particularly, each time that the high side switch $SW_2$ is turned off (i.e. opened), the sample circuit preferably waits a delay period of approximately 250 to 300 nanoseconds and then samples the level of $V_{IN}$. Therefore, the samples are taken at approximately when $V_{\underline{s}}$ is equal to zero volts. Successive samples of $V_{IN}$ can be averaged to ensure that the monitored level of $V_{IN}$ does not change rapidly. The sample/logic circuit 184 generates a signal $\sim V_{IN}$ (steady-state) which is representative of the level of $V_{IN}$. This signal is used for generating the current $I_3$ which is also representative of the level of $V_{IN}$.

Elements of FIG. 16 detect the level of $V_{\tilde{s}}$ for controlling switching of $SW_2$ as shown in FIGS. 3-5, 7, 8 and 10. The signal READYHIGHON informs the high driver controller 154 that it can (i.e. has permission to) turn on the switch $SW_2$. The high driver controller 154 then determines the timing of turning on the switch $SW_2$: when $V_{\underline{s}}$ is reaches the level of $V_{IN}$ (as indicated by the signal $I_{LIMIT}$) the high driver controller 154 turns on the switch $SW_2$.

The flip-flop $FF_1$ and the delay block 172 are used to delay turning on the switch $SW_2$ so as to avoid turning on the switch prematurely. The $U_{VLO}$ signal inhibits switching in case of an under-voltage condition.

The switch $SW_2$ stays on until the switch $SW_2$ is turned off based on comparison performed by comparator 176. More particularly, the switch $SW_2$ is turned off (opened) when $V_{IN}$ is substantially equal to $V_{\underline{s}}$ as offset by an amount indicated by the level of $\sim V_{IN}$ (steady-state). The comparator 176 preferably performs its comparison with hysteresis so as to avoid multiple changes in the level of its output at crossings of the input signal levels of the comparator 176.

As shown in FIG. 16, the voltage supply $V_{BOOT}$ may be coupled to a third input to the sample/logic circuit 184. This can be used for determining whether the power converter 150 is under light or heavy loading conditions. For example, $V_{BOOT}$ may be regulated to approximately 15 volts DC. When $V_{BOOT}$ rises above a threshold level of 15 volts, this indicates light loading. Conversely, when $V_{BOOT}$ falls below the threshold level of 15 volts, this indicates that the loading is no longer light. In accordance with an embodiment of the present invention, when the converter 150 is under light loading conditions, the function of turning off the switch $SW_2$ based on the level of $V_{IN}$ can be disabled. More particularly, when the level of $V_{BOOT}$ is above the threshold, the adjustment to the current $I_3$ based on the level of $\sim V_{IN}$ (steady-state) can be made equal to zero. When this occurs, the comparator 176 can compare the level of $V_{IN}$ (as represented by $R_{VIN}$) to the level of $V_{\underline{s}}$ in order to determine when to open the switch $SW_2$. Under these conditions, the switch $SW_2$ can be opened under ZVS. Additionally, when the level of $V_{IN}$ is at a maximum threshold (e.g. 380 volts DC), the adjustment to the current $I_3$ based on the level of $\sim V_{IN}$ (steady-state) can also be equal to zero. However, when the level of $V_{BOOT}$ is above the threshold (and the level of $V_{IN}$ is below its maximum threshold), the level of the current $I_3$ can be representative of the level of $V_{IN}$ so that the switch $SW_2$ is opened based in part on the monitored level of $V_{IN}$ (i.e. ~$V_{IN}$ (steady-state)).

The sample/logic circuit 184 may also be used to determine when the high side driver controller 154 enters the third mode of operation. More particularly, the sample/logic circuit 184 may use the $R_{VIN}$ and $V_{BOOT}$ signals to make this determination since those signals are representative of the input voltage and load power, respectively. A signal HIGH SIDE PULSE ENABLE is activated to indicate that the high side driver controller 154 has entered the third mode of operation. This signal is applied to the logic OR gate 165 which overrides the determination by the high driver controller 154 of the timing for turning on the switch $SW_2$. Instead, the switch $SW_2$ is directed to turn on and/or off in response to receipt of the READYHIGHON signal. It will be apparent that the high side driver 154 can determine whether to enter the third mode in another manner. This can include, for example, monitoring the input voltage and load power in another manner and/or bypassing the $V_s$ sensing for turning on the switch $SW_2$ in another manner. Alternatively, the signal HIGH SIDE PULSE ENABLE need not be generated. In this case, the logic OR gate 165 can be omitted and the signal $I_{LIMIT}$-bar can be coupled to the logic NAND gate 166. In this case, the signal $I_{LIMIT}$-bar and the signal READYHIGHON must both be active in order for the high side switch to be closed.

Figure 17:
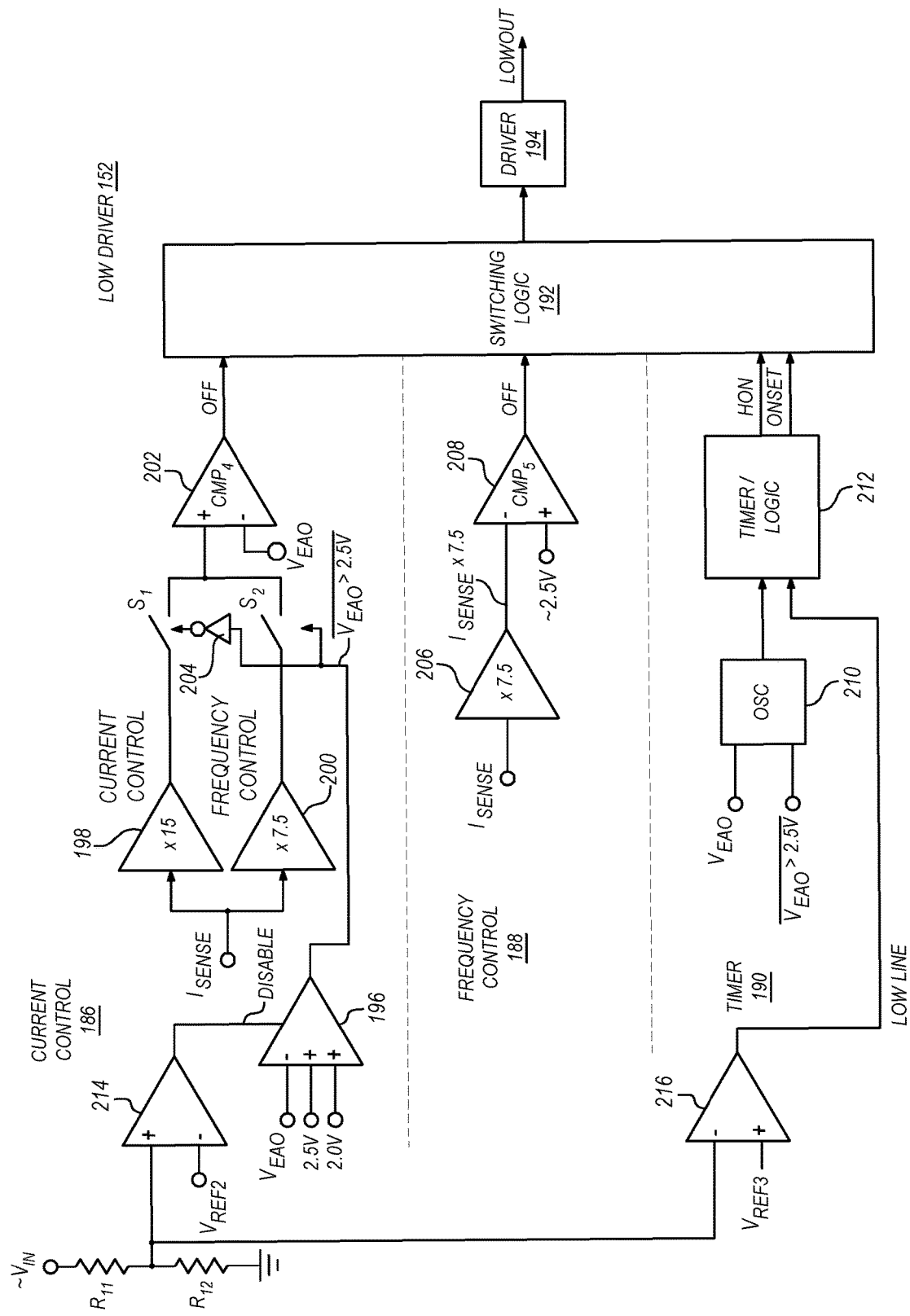
FIG. 17 illustrates a low side driver control circuitry for a flyback converter in accordance with an embodiment of the present invention.

FIG. 17 illustrates control circuitry of the low driver 152 in accordance with an embodiment of the present invention. As shown in FIG. 17, the low driver 152 includes a current control section 186, a frequency control section 188, a timer section 190, switching logic 192 and a switch driver 194.

Within the current control section 186 of the low driver 152, the signal $V_{EAO}$ is coupled to a first input to a comparator 196. A second input to the comparator 196 receives a first reference voltage (e.g. 2.5 volts) while a third input to the comparator 196 receives a second reference voltage (e.g. 2.0 volts). The comparator 196 generates a signal "$V_{EAO}$>2.5v-bar" by comparing the signal $V_{EAO}$ to the first and second reference voltages; the signal "$V_{EAO}$>2.5v -bar" is activated when $V_{EAO}$ rises above the first reference and is deactivated when the signal $V_{EAO}$ falls below the second reference. Thus, the comparator 196 performs its comparison with hysteresis. The comparator 196 determines whether low driver controller 152 performs switching based on peak current control or based on frequency control. When $V_{EAO}$ rises above 2.5 volts, switching is by peak current control; when $V_{EAO}$ falls below 2.0 volts, switching is by frequency control. Thus, the logic level of "$V_{EAO}$>2.5v -bar" determines whether the switching is based on peak current control or frequency control.

The signal $I_{SENSE}$ is coupled an input to a first amplifier 198 and to an input to a second amplifier 200. The amplifier 198 can have, for example, a gain of 15, while the amplifier 200 can have a gain of, for example 7.5. The output of the amplifier 198 is coupled to a first input to a comparator 202 via a switch $S_1$. The output of the amplifier 200 is coupled to the first input of the comparator via a switch $S_2$. The signal $V_{EAO}$ is coupled to a second input to the comparator CMP4. The signal "$V_{EAO}$>2.5v -bar" is coupled to control the switch $S_2$ and to control the switch $S_1$ via an inverter 204. Thus, one of the switches $S_1$ are $S_2$ is closed while the other is opened dependent upon the signal "$V_{EAO}$>2.5v -bar". Accordingly, the outputs of the amplifiers 198 and 200 are selectively coupled to the first input of a comparator 202 dependent upon the level of $V_{EAO}$. An output of the comparator 202 is coupled to an input to switching logic 192.

In accordance with current control, the amplifier 198 having higher gain is active so as to magnify the effect of $I_{SENSE}$ in comparison to $V_{EAO}$ by comparator 202. In accordance with frequency control, the amplifier 200 is active which employs lower gain so as to reduce the effect of' SENSE in the comparison which causes the frequency control section 188 to primarily control switching.

Within the frequency control section 188 of the low driver 152, the signal $I_{SENSE}$ is coupled to an input to an amplifier 206. The amplifier 206 can have, for example, a gain of 7.5. An output of the amplifier 206 is coupled to a first input to a comparator 208. A second input to the comparator is coupled to a reference voltage, which can be, for example, approximately 2.5 volts. An output of the comparator 208 is coupled to an input to switching logic 178.

The current control section 186 and the frequency control section 188 control the timing of turning off the low side switch $SW_1$ within each switching cycle via switching logic 192.

The timer section 190 of the low driver 152 controls switching frequency as well as the timing for turning on the low side switch $SW_1$ for each switching cycle. The timer section 190 also generates the signal HON which is used to generate the signal READYHIGHON (see FIG. 18). The signal READYHIGHON is used by the high driver controller 154 to control the switch $SW_2$ for the first and second modes of operation of the high side switch $SW_2$ and is also used to generate the pulse signal for the third mode of operation of the high side switch $SW_2$. Within the timer section 190, the signal $V_{EAO}$ is coupled to a first input to an oscillator 210. The signal "$V_{EAO}$>2.5v -bar" from the comparator 196 is coupled to a second input of the oscillator 210. The oscillator 210 generates a periodic ramp signal that is coupled to an input of timer/logic block 212.

The timer/logic block 212 generates a logic signal HON and a logic signal ONSET which are coupled to the switching logic 192. The signal HON is used by the low driver controller 152 (FIG. 14) to generate the signal READYHIGHON for the high driver controller 154. For peak current control, the signal HON is generated at fixed intervals. The signal ONSET is used to turn on the low side switch $SW_1$. For example, a timer of 3.33 microseconds can be reset for each switching cycle; 500 nanoseconds prior to expiration of the timer, the signal HON is activated. And, upon expiration of the timer, and once ZCD is greater than zero, then the signal ONSET can be activated. Once ONSET is activated, then the low side switch $SW_1$ can be closed upon a valley in signal ZCD (since ZCD represents $V_s$) so as to operate the switch $SW_1$ under zero volt switching (ZVS) conditions. The 500 nanosecond difference ensures that HON is activated prior to ONSET.

The signal ZCD is referenced to the same ground level as the low side driver controller 152. The signal ZCD is also representative of the level of $V_s$. Thus, signal ZCD is used by the low side driver controller 152 as a proxy for $V_s$ in order to operate the switch $SW_1$ under ZVS conditions.

For current control, rather than a fixed timer interval of 3.33 microseconds, for example, the timer interval is varied dependent upon the level of $V_{EAO}$. Thus, the timer interval affects the switching frequency for regulating the output voltage in a feedback loop.

The timer interval of 3.33 microseconds corresponds to a switching frequency for peak current control of 300 kHz. In an embodiment, the switching frequency $f_{clamp}$ can be clamped at 500 kHz, 300 kHz, 145 kHz, or some other selected frequency by appropriate selection of timing components.

An output of the switching logic 192 is coupled to a driver 194. The driver 194 generates the signal LOWOUT.

During a switching cycle of the switches $SW_1$ and $SW_2$, the level of $V_S$ rises above the level of $V_{IN}$ immediately upon opening of the low side switch $SW_1$. Under light load conditions, energy stored in the primary side of the transformer $T_1$ is not as effectively transferred to its secondary side. The energy stored in the snubber capacitor $C_{SN}$ can therefore increase with each switching cycle so that it becomes overcharged with energy and so that the level of $V_S$ can ring to an excessively high level upon opening of the low side switch $SW_1$. These effects of a light load condition can be mitigated by turning on the high side switch $SW_2$ earlier in the switching cycle. Thus, in accordance with an embodiment of the present invention, the high side switch $SW_2$ is turned on earlier in the switching cycle under certain light load conditions than it would otherwise be turned on. Similarly, when the input supply voltage $V_{IN}$ is at a high level, this can also result in overcharging the snubber capacitor $C_{SN}$. This can also be mitigated by turning on the high side switch $SW_2$ earlier in the switching cycle. Using frequency control to control switching when the input voltage $V_{IN}$ is at a high level, rather than current control, can also help to mitigate these issues. Thus, in accordance with an embodiment of the present invention, frequency control is used under certain high input voltage conditions.

In an embodiment, a comparator 214 is included in the current control section 186 of FIG. 17 which compares the level of the signal $R_{VIN}$ (which is representative of the voltage $V_{IN}$) to a reference. As shown in FIG. 17, the signal $R_{VIN}$ can be stepped down by a voltage divider that includes resistors $R_{11}$ and $R_{12}$. The stepped down voltage is representative of the level of $V_{IN}$ and is compared to a reference voltage $V_{REF2}$. When this comparison indicates that the level of $V_{IN}$ is greater than a threshold (e.g., 226 volts DC), then the output of the comparator 214 disables the comparator 196. As a result, the switch $S_1$ is open and the switch $S_2$ is closed so that the amplifier 200 is active. This causes the frequency control section 188 of the flyback converter control circuitry to primarily control switching, rather than the current control section 186. Thus, the controller of the flyback converter operates in the frequency control mode upon detection of a supply voltage condition (e.g. when $V_{IN}$ is greater than the threshold of 226 volts DC).

In an embodiment, the timer section 190 in FIG. 17 includes a comparator 216. The comparator 216 is configured to compare the stepped down voltage that is representative of the level of $V_{IN}$ (at the node between resistors $R_{11}$ and R 12) to a reference voltage $V_{REF3}$. When this comparison indicates that the level of $V_{IN}$ is lower than a threshold, then the output of the comparator 216 generates a signal LOWLINE which is coupled to the time 212. In response, the timer/logic 212 can generate the pulse signal discussed herein which is then used to generate the signals HON which is used by the low driver 152 to generate READYHIGHON in accordance with the third mode of operation of the high side switch $SW_2$.

Figure 18:
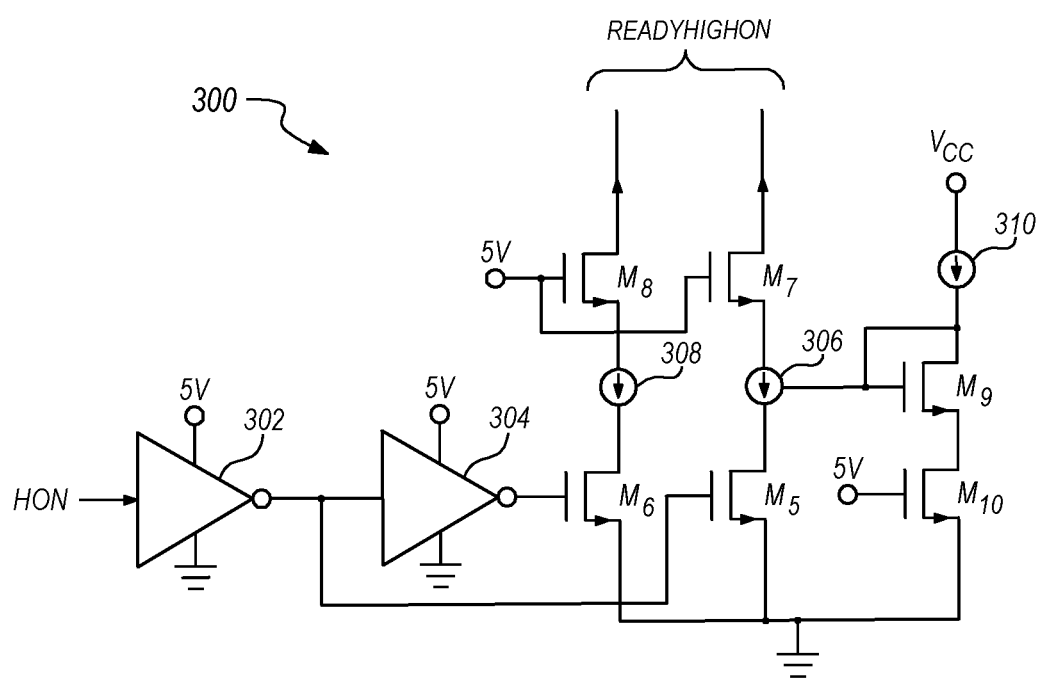
FIG. 18 illustrates a differential signal converter for use in control circuitry for a flyback converter in accordance with an embodiment of the present invention.

FIG. 18 illustrates a differential signal converter 300 for use in control circuitry for a flyback converter in accordance with an embodiment of the present invention. The differential signal converter 300 converts the single-ended signal HON to a differential logic signal READYHIGHON. The logic signal HON is coupled to an input of a first inverter 302. An output of the first inverter 302 is coupled to an input to a second inverter 304 and to control a MOSFET $M_5$. An output of the second inverter 304 is coupled to control a MOSFET $M_6$. A MOSFET $M_7$ and a current source 306 are coupled in series with the MOSFET $M_5$. A MOSFET $M_8$ and a current source 308 are coupled in series with the MOSFET $M_6$. A current source 310 is coupled in series with MOSFET $M_9$ and MOSFET $M_{10}$. A reference current passes through the MOSFETS $M_9$ and $M_{10}$. The signal HON activates one of the MOSFETS $M_5$ or $M_7$ dependent upon the level of HON. The reference current is mirrored in the MOSFET $M_8$ or in the MOSFET $M_7$ dependent upon which of the MOSFETS $M_5$ or $M_7$ is active. The state of the differential signal READYHIGHON is dependent upon which of the MOSFETS $M_5$ or $M_7$ is active. Thus, the converter 300 converts the logic signal HON to the differential logic signal READYHIGHON.

Figure 19:
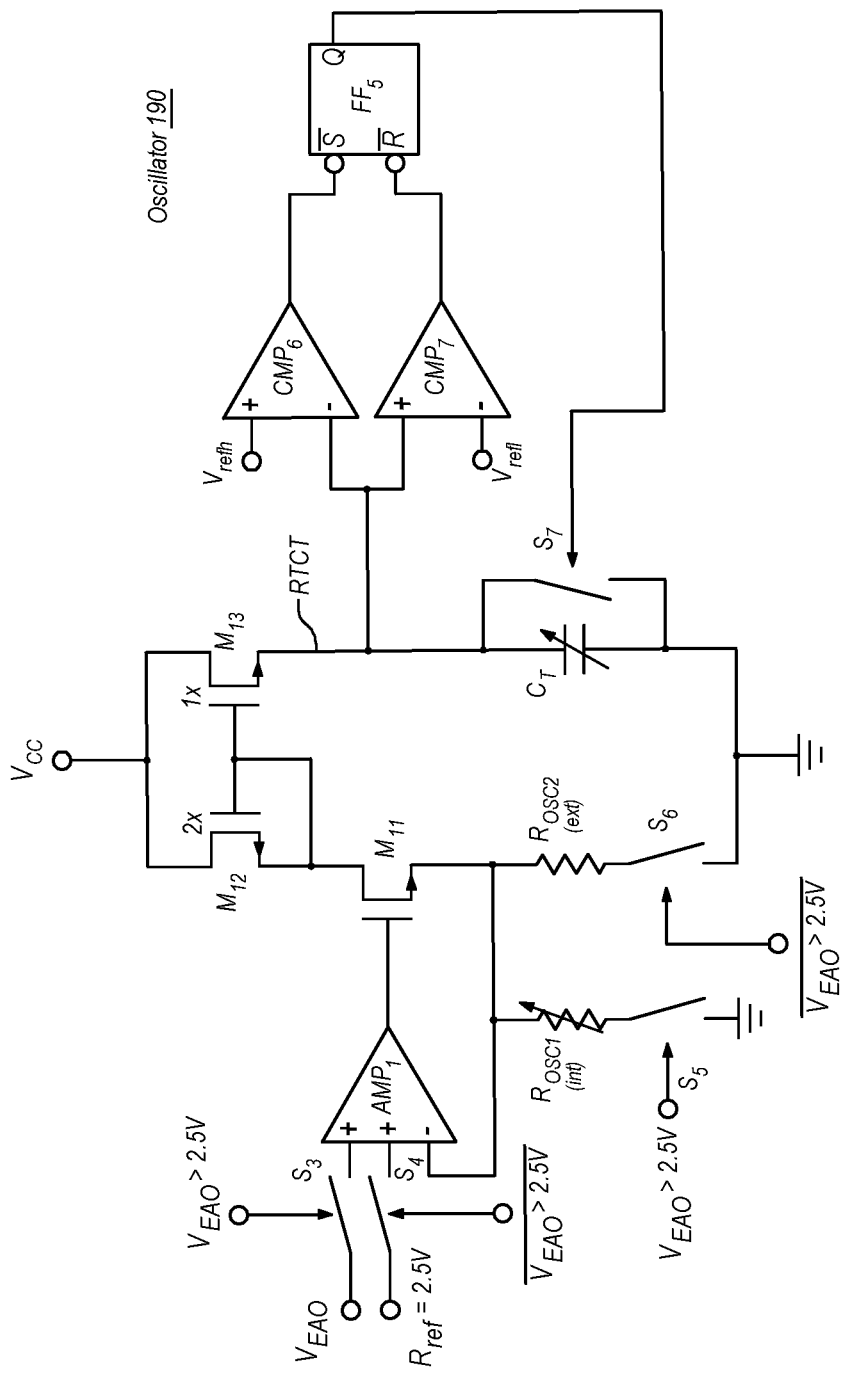
FIG. 19 illustrates an oscillator for use in control circuitry for a flyback converter in accordance with an embodiment of the present invention.

FIG. 19 illustrates an oscillator for use in control circuitry for a flyback converter in accordance with an embodiment of the present invention. FIG. 19 shows additional details of the oscillator 190 of FIG. 15. As shown in FIG. 19, the signal $V_{EAO}$ is coupled to a first input to an amplifier $AMP_1$ via a switch $S_3$. A reference voltage of, for example, 2.5 volts, is coupled to a second input of the amplifier $AMP_1$ via a switch $S_4$. A third input to the amplifier $AMP_1$ is coupled to a first terminal of an adjustable resistor $R_{OSC1}$ and to a first terminal of a resistor $R_{OSC2}$. An output of the amplifier $AMP_1$ is coupled to a control terminal of MOSFET $M_{11}$. An output terminal of the MOSFET $M_{11}$ is coupled to the first terminal of the resistor $R_{OSC1}$ and to the first terminal of the resistor $R_{OSC2}$. A second terminal of the resistor $R_{OSC1}$ is coupled to a ground node via a switch $S_5$. A second terminal of the resistor $R_{OSC2}$ is coupled to the ground node via a switch $S_6$.

A supply voltage $V_{CC}$ is coupled to an input terminal of a MOSFET $M_{12}$ and to an input terminal of a MOSFET $M_{13}$. An output terminal of the MOSFET $M_{12}$ is coupled to a control terminal of the MOSFET $M_{12}$, to a control terminal of the MOSFET $M_{13}$ and to an input terminal of the MOSFET Mu. An output terminal of the MOSFET $M_{13}$ is coupled to a first terminal of an adjustable capacitor $C_T$, to a first input terminal (inverting) to a comparator $CMP_6$ and to a first input terminal (non-inverting) to a comparator $CMP_7$. A second terminal of the adjustable capacitor $C_T$ is coupled to the ground node. A second input terminal to the comparator $CMP_6$ is coupled to a reference voltage Vrefh. A second input terminal to the comparator $CMP_7$ is coupled to a reference voltage Vrefl. An output of the comparator $CMP_6$ is coupled to an inverted set input S-bar of a flip-flop $FF_5$. An output of the comparator $CMP_7$ is coupled to an inverted reset input R-bar of the flip-flop $FF_5$. An output Q of the flip-flop $FF_5$ is coupled to control a switch $S_7$. The switch $S_7$ is coupled to across the capacitor $C_T$.

The switches $S_3$ and $S_5$ are controlled by the signal "$V_{EAO}$>2.5v" while the switches $S_4$ and $S_6$ are controlled by the logic signal "$V_{EAO}$>2.5v -bar". Thus, when $V_{EAO}$ is greater than the 2.5 volt threshold, the switches $S_3$ and $S_5$ are closed and the switches $S_4$ and $S_6$ are open; when $V_{EAO}$ is below the 2.0 volt threshold, the switches $S_4$ and $S_6$ are closed and the switches $S_3$ and $S_5$ are open. As explained herein, the signals "$V_{EAO}$>2.5v" and its inverse "$V_{EAO}$>2.5v -bar" are generated with hysteresis.

The oscillator 190 generates a periodic ramp signal RTCT across the capacitor $C_T$. The transistors $M_{12}$ and $M_{13}$ form a current mirror such that the current through the transistor $M_{13}$ charges the capacitor $C_T$. When the voltage across the capacitor $C_T$ reaches Vrefh, the capacitor $C_T$ is discharged by closing the switch S 7 until the voltage across the capacitor $C_T$ falls below Vrefl. The switch S 7 is then opened.

The frequency of the ramp signal RTCT is changed dependent upon of the state of the logic signal "$V_{EAO}$>2.5v".

More particularly, when $V_{EAO}$ is less than 2.0 volts (the signal "$V_{EAO}$>2.5v" is a logic "0"), the flyback converter operates in the frequency control mode in which the switching frequency and is dependent upon the level of $V_{EAO}$. This is accomplished by closing the switch $S_3$ so that $V_{EAO}$ is coupled to the amplifier $AMP_1$ which turns on the MOSFET $M_{11}$ in relation to the level of $V_{EAO}$. The level of current in the current mirror of MOSFET $M_{12}$ and $M_{13}$ is, therefore, affected by the level of $V_{EAO}$ which, in turn, affects the rate of charging the capacitor $C_T$ and the frequency of the ramp signal RTCT. The frequency of the ramp signal RTCT is the same as the switching frequency of the flyback converter. Thus, in this frequency control mode, the switching frequency is controlled in a feedback loop to regulate the output voltage where the switching frequency is dependent upon $V_{EAO}$.

The frequency control mode continues unless $V_{EAO}$ rises above 2.5 volts. When $V_{EAO}$ rises above 2.5 volts and the signal "$V_{EAO}$>2.5v" becomes a logic "1" then the switch $S_3$ is opened and the switch $S_4$ is closed which couples a fixed reference voltage to the input of the amplifier $AMP_1$ so that the current that charges the capacitor $C_T$ is essentially constant. This causes the switching frequency for the flyback converter to be essentially constant; in this mode, current is controlled in feedback loop to regulated the output voltage.

The frequency of the ramp signal RTCT and, thus, the switching frequency of the flyback converter is dependent upon the value of $C_T$ as well as the resistor $R_{OSC1}$ and $R_{OSC2}$. In the current control mode, the switch $S_6$ is closed so that the resistor $R_{OSC2}$ affects the switching frequency whereas the switch $S_5$ is opened so that the resistor $R_{OSC1}$ does not affect the switching frequency. In the frequency control mode, the switch $S_6$ opened so that the resistor $R_{OSC2}$ no longer affects the switching frequency and the switch $S_5$ is closed so that the resistor $R_{OSC1}$ does affect the switching frequency. The values of $C_T$, $R_{OSC1}$ and $R_{OSC2}$ are selected so as to appropriately set the nominal switching frequency in the frequency control mode, as well as the essentially fixed switching frequency in the current control mode. Additionally, the values of the resistor $R_{OSC1}$ and the capacitor $C_T$ can preferably be fine-tuned, e.g. by laser or fuse trimming in order to ensure that there is a smooth transition between the frequency control and current control modes. For this purpose, the resistor $R_{OSC1}$ is preferably incorporated into the IC package shown in FIG. 15.

Component selection for the oscillator can include first selecting a value for the resistor $R_{OSC2}$, which sets the clamping frequency $f_{clamp}$. Then, the capacitor $C_T$, which is preferably internal to the low driver controller IC 152, is trimmed to fine-tune the clamping frequency. Finally, the internal resistor $R_{OSC1}$, which is also preferably internal to the low driver controller IC 152, is trimmed to fine-tune the switching frequency at the transition between current control and frequency control modes of operation.

Figure 20:
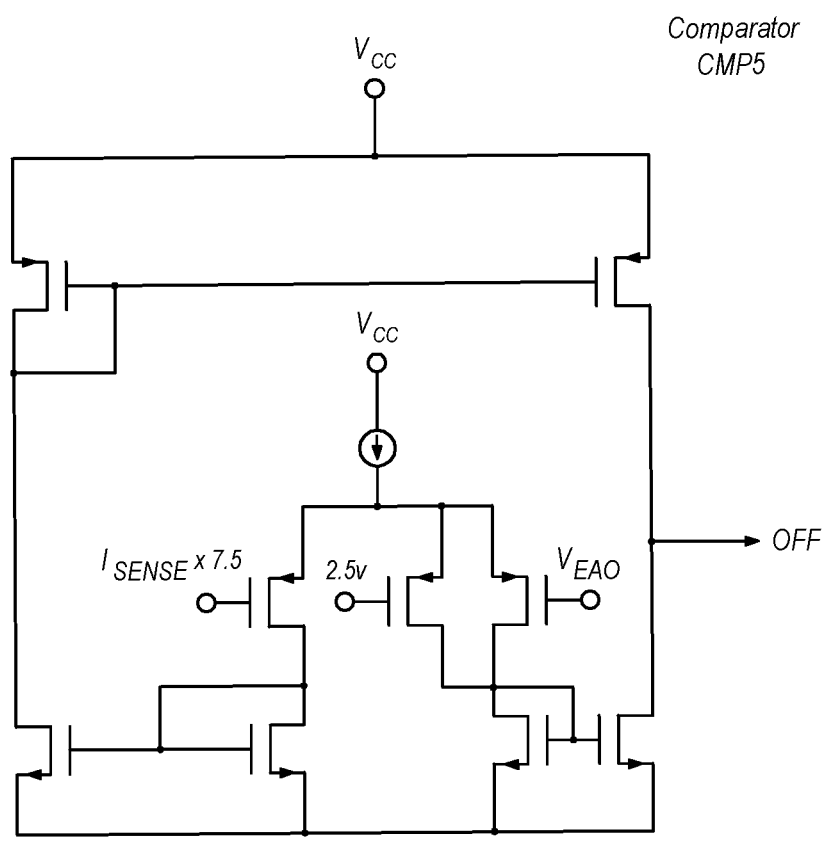
FIG. 20 illustrates a comparator for use in control circuitry for a flyback converter in accordance with an embodiment of the present invention.

FIG. 20 illustrates a comparator for use in control circuitry for a flyback converter in accordance with an embodiment of the present invention. The comparator of FIG. 20 can be used in place of the comparator CMP5 shown in the frequency mode control section 174 of FIG. 15. As shown in FIGS. 10 and 14, the comparator accepts as input the signal $I_{SENSE} \times 7.5$ which is compared to a reference voltage of 2.5 volts for generating the signal OFF. The signal OFF is used to turn off the main switch $SW_1$. The comparator of FIG. 20 additionally accepts as input the signal $V_{EAO}$. The signal $V_{EAO}$ reduces the effective level of the reference voltage thereby generating the signal OFF sooner and therefore reducing the switching frequency. This is useful to reduce switching noise in burst mode.

Figure 21:
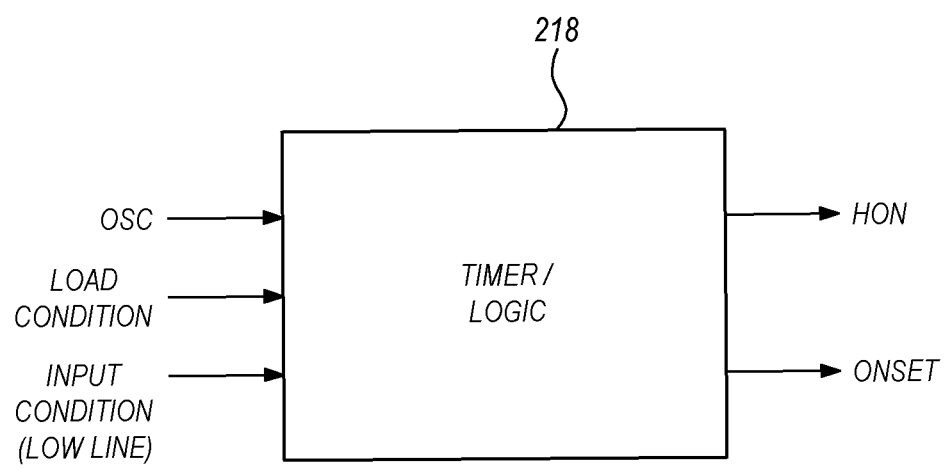
FIG. 21 illustrates a timer for use in control circuitry for a flyback converter in accordance with an embodiment of the present invention.

FIG. 21 illustrates an embodiment of a timer/logic in accordance with an embodiment of the present invention. The timer 212 of FIG. 17 can be replaced with timer/logic 218 of FIG. 21. As shown in FIG. 21, the timer/logic 218 accepts as input a "Load Condition" signal and an "Input Condition" signal (which corresponds to the LOWLINE signal described herein), in addition to the oscillator signal OSC. The timer/logic 218 uses these signals to generate the signals HON and ONSET described herein. The Load Condition and Input Condition signals are binary (i.e. each having two possible states such as true/false or zero/one) and indicate when the current loading is light and when the input voltage $V_{IN}$ is high, respectively. Because the signal $V_{EAO}$ is indicative of loading, the Load Condition signal can be equivalent to the logic signal "$V_{EAO}$>2.5v-bar".

Similarly to the timer 212 of FIG. 17, the timer 218 of FIG. 21, generates a logic signal HON and a logic signal ONSET, which are coupled to the switching logic 178. The signal HON is used to generate the signal READYHIGHON for the high driver controller 154. For frequency control, the signals HON and ONSET are generated at intervals that depend on the switching frequency as determined by the frequency of the oscillator signal OSC. For example, a timer having a variable time duration can be reset for each switching cycle. This time duration will change dependent upon the switch frequency. The time duration for a particular frequency can be, for example, 3.33 microseconds. At an instant prior to expiration of the timer, the signal HON is activated. The amount of time prior to expiration of the timer that the activation of HON occurs is also dependent upon the switching frequency but can also be dependent upon the levels of Load Condition and Input Condition signals in order to turn on the high side switch $SW_2$ earlier in the switching cycle. For example, when the switching frequency results in the timer duration being 3.33 microseconds, the activation can occur 500 nanoseconds prior to expiration of the timer under normal conditions. However, if one or both of the Load Condition and Input Condition signals indicates a light load condition or a high input voltage condition, then the time duration may be adjusted (e.g. increased to 1000 nanoseconds or 1.0 microsecond) in order to activate the signal HON earlier in the switching cycle and therefore to also turn on the switch $SW_2$ earlier in the switching cycle.

As explained herein, the signal HON can be used to generate the signal READYHIGHON which is used by the high driver controller 154 (FIG. 14) to control the mode of operation of the high side switch $SW_2$. The low driver controller 152 therefore can determine the mode of operation (e.g., "first" mode, "second" mode, "third" mode or a combination thereof, as described herein) of the high side switch $SW_2$. More particularly, the timer/logic 218 of the low driver controller 152 can determine the mode of operation of the high side switch $SW_2$.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A controller configured to control a flyback power converter, the flyback power converter having a low side switch and a high side switch, wherein the controller is configured to generate drive signals that control the opening and closing of the low side switch once during each of a series of switching cycles, and wherein the controller is configured to control the high side switch so that the high side switch is closed and then opened two times during each of the series of switching cycles.

2. The controller according to claim 1, wherein the controller is configured to control the flyback power converter so that an output voltage is formed from a current induced in a secondary winding of a transformer and wherein the output voltage is regulated in a feedback loop.

3. The controller according to claim 1, wherein the controller is configured to select between a mode of operation in which the high side switch is closed and then opened once during each of the series of switching cycles and a mode of operation in which the high side switch is closed then opened two times during each of the series of switching cycles according to a level of power delivered to a load.

4. The controller according to claim 1, wherein the controller is configured to select between a mode of operation in which the high side switch is closed and then opened once during each of the series of switching cycles and a mode of operation in which the high side switch is closed then opened two times during each of the series of switching cycles according to a level of line voltage available as input to the power converter.

5. A switching power supply comprising: the controller according to claim 1; and a power converter comprising a transformer, the low side switch, the high side switch and a snubber capacitor.

6. A controller configured to control a flyback power converter, the flyback power converter having a low side switch and a high side switch, wherein the controller is configured to generate drive signals that control the opening and closing of the low side switch once during each of a series of switching cycles, and wherein the controller is configured to control the high side switch so that the high side switch is closed and then opened two times during each of the series of switching cycles wherein the controller is configured to monitor a first voltage generated at a node between the low side switch and the high side switch for determining time instants for closing and opening the high side switch.

7. A controller configured to control a flyback power converter, the flyback power converter having a low side switch and a high side switch, wherein a first voltage is generated at a node between the low side switch and the high side switch, and wherein the controller is configured to generate drive signals that control the opening and closing of the low side switch and the high side switch, and wherein the controller is configured to selectively operate in a mode in which the high side switch is closed during each of a series of switching cycles based on a comparison of the supply voltage to the first voltage and in a mode in which the high side switch is held open during each of a series of switching cycles thereby a current through the high side switch is passively rectified by a body diode of the high side switch, and wherein the controller is configured to select between the modes of operation according to a level of the supply voltage or load power.

8. The controller according to claim 7, wherein the controller is configured to control the flyback power converter so that an output voltage is formed from a current induced in a secondary winding of a transformer and wherein the output voltage is regulated in a feedback loop.

9. The controller according to claim 7, wherein the controller comprises a high side driver controller that is configured to control the high side switch wherein a signal informs the high side driver controller that the high side driver controller has permission to close the high side switch.

10. The controller according to claim 9, wherein the controller comprises a low side driver controller that is configured to control the low side switch and wherein the low side driver controller and the high side driver controller have different ground reference voltages and wherein the signal that informs the high side driver controller that the high side driver controller has permission to close the high side switch is communicated to the high side driver controller by the low side driver via a differential signal.

11. A switching power supply comprising: the controller according to claim 7; and a power converter comprising the transformer, the low side switch, the high side switch and the snubber capacitor.

12. A controller configured to control a flyback power converter, the flyback power converter having a low side switch and a high side switch, wherein a first voltage is generated at a node between the low side switch and the high side switch, and wherein the controller is configured to generate drive signals that control the opening and closing of the low side switch and the high side switch, wherein the controller is configured to selectively operate in a mode in which the high side switch is closed during each of a series of switching cycles based on a comparison of the supply voltage to the first voltage and in a mode in which the high side switch closed during each of a series of switching cycles in response to a pulse signal, and wherein the controller selects between the modes of operation according to a level of the supply voltage or load power.

13. The controller according to claim 12, wherein the controller is configured to control the flyback power converter so that an output voltage is formed from a current induced in a secondary winding of a transformer and wherein the output voltage is regulated in a feedback loop.

14. The controller according to claim 12, wherein the controller comprises a low side driver controller that is configured to control the low side switch and a high side driver controller that is configured to control the high side switch, wherein the low side driver controller and the high side driver controller have different ground reference voltages and wherein the signal that informs the high side driver controller that the high side driver controller has permission to close the high side switch is communicated to the high side driver controller by the low side driver via a differential signal.

15. The controller according to claim 12, wherein a duration of the pulse signal determines a duration of time during which the high side switch is closed.

16. The controller according to claim 15, wherein a duration of the pulse signal determines a duration of time during which the high side switch is closed.

17. The controller according to claim 12, wherein the duration of the pulse signal is dependent upon the level of the supply voltage.

18. The controller according to claim 17, wherein the duration of the pulse signal is adjustable by adjusting a resistor value.

19. A switching power supply comprising: the controller according to claim 12; and a power converter comprising the transformer, the low side switch, the high side switch and the snubber capacitor.

* * * * *